United States Patent
Kato et al.

(10) Patent No.: US 9,509,870 B2
(45) Date of Patent: Nov. 29, 2016

(54) IMAGE PROCESSING APPARATUS, IMAGE PROCESSING METHOD, AND STORAGE MEDIUM ENABLING LAYOUT VARATIONS

(71) Applicant: CANON KABUSHIKI KAISHA, Tokyo (JP)

(72) Inventors: Masao Kato, Kawasaki (JP); Yusuke Hashii, Tokyo (JP); Kiyoshi Umeda, Kawasaki (JP); Hiroyasu Kunieda, Yokohama (JP); Hiroyuki Sakai, Chigasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/476,617

(22) Filed: Sep. 3, 2014

(65) Prior Publication Data

US 2015/0062653 A1 Mar. 5, 2015

(30) Foreign Application Priority Data

Sep. 5, 2013 (JP) ................................. 2013-184047

(51) Int. Cl.
*G06K 15/02* (2006.01)
*H04N 1/00* (2006.01)

(52) U.S. Cl.
CPC .. *H04N 1/00442* (2013.01); *H04N 2201/3247* (2013.01); *H04N 2201/3273* (2013.01)

(58) Field of Classification Search
CPC ....................................................... H04N 1/00
See application file for complete search history.

(56) References Cited

U.S. PATENT DOCUMENTS 7,236,632 B2 * 6/2007 Erol .................. G06F 17/30256
382/218

2013/0004073 A1 * 1/2013 Yamaji .................... G06T 11/60
382/173
2014/0079324 A1 * 3/2014 Ishige ........................... 382/224

FOREIGN PATENT DOCUMENTS

| JP | 5-197793 A | 8/1993 |
|---|---|---|
| JP | 8-63597 A | 3/1996 |
| JP | 8-77334 A | 3/1996 |
| JP | 2541688 B2 | 10/1996 |
| JP | 11-53525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |

(Continued)

*Primary Examiner* — Andrew H Lam
(74) *Attorney, Agent, or Firm* — Canon U.S.A.Inc., IP Division

(57) ABSTRACT

An apparatus including an acquisition unit configured to acquire at least one image group including at least one image; a creating unit configured to create a plurality of layout candidates, by selecting at least one image from an image group acquired by the acquisition unit, and arranging the at least one selected image; an evaluation unit configured to evaluate the layout candidates created by the creating unit; a deciding unit configured to decide a presentation order of a plurality of selected layout candidates, based on evaluation results from the evaluation unit; and a presenting unit configured to present layout candidates in the presentation order decided by the deciding unit; wherein the deciding unit decides the presentation order so that the presentation order is different from an order of evaluation values from the evaluation unit, based on the evaluation results of the evaluation unit.

19 Claims, 28 Drawing Sheets

(56) References Cited

FOREIGN PATENT DOCUMENTS

| JP | 2003-30667 A | 1/2003 |
|----|----|----|
| JP | 3469031 B2 | 11/2003 |
| JP | 2006-287917 A | 10/2006 |
| JP | 2009-245071 A | 10/2009 |
| JP | 2010-251999 A | 11/2010 |
| JP | 2010-273144 A | 12/2010 |

* cited by examiner

FIG. 9

```
<?xml version="1.0" encoding="utf-8"? >
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                . . .
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        . . .
</IMAGEINFO>
```

FIG. 12

```
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 16

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

. . . . . . .

</LayoutInfo>
```

FIG. 22

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

. . . . . . .

</LayoutInfo>
```

FIG. 23

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 24

```xml
<?xml version="1.0" encoding="utf-8" ?>
<LayoutInfo>
	<BASIC>
		<Theme>growth</Theme>
		<PageSize>A4</PageSize>
		<Resolution>300</Resolution>
		<MainGroup>son</MainGroup>
		<SubGroup>son, father</SubGroup>
	</BASIC>
	<ImageSlot>
		<ID>0</ID>
		<POSITION>
			<LeftTop x=400, y=900/>
			<LeftBottom x=400, y=1500/>
			<RightTop x=1300, y=900/>
			<RightBottom x=1300, y=1500/>
		</POSITION>
		<Shape>Rectangle</Shape>
		<PersonGroup>SubGroup</PersonGroup>
		<ImageID>0x00000001</ImageID>
		<TrimingRatio>50.0</TrimingRatio>
	</ImageSlot>
	<ImageSlot>
		<ID>1</ID>
		<POSITION>
			<LeftTop x=700, y=100/>
			<LeftBottom x=700, y=500/>
			<RightTop x=1100, y=100/>
			<RightBottom x=1100, y=500/>
		</POSITION>
		<Shape>ellipse</Shape>
		<PersonGroup>MainGroup</PersonGroup>
		<ImageID>0x00000089</ImageID>
		<TrimingRatio>38.0</TrimingRatio>
	<ImageSlot>
		<ID>2</ID>
		<POSITION>
			<LeftTop x=1100, y=200/>
			<LeftBottom x=1100, y=600/>
			<RightTop x=1450, y=200/>
			<RightBottom x=1450, y=600/>
		</POSITION>
		<Shape>ellipse</Shape>
		<PersonGroup>MainGroup</PersonGroup>
		<ImageID>0x00000129</ImageID>
		<TrimingRatio>53.0</TrimingRatio>
	</ImageSlot>

. . . . . . .

</LayoutInfo>
```

IMAGE PROCESSING APPARATUS, IMAGE PROCESSING METHOD, AND STORAGE MEDIUM ENABLING LAYOUT VARATIONS

BACKGROUND OF THE INVENTION

Field of the Invention

The present disclosure generally relates to image processing and, more particularly, to an image processing apparatus, an image processing method, and a storage medium.

Description of the Related Art

As digital cameras and mobile terminals have become more commonplace in recent years, an environment has developed where pictures can be readily taken. There is also known a method where a personal computer (PC) is used to create various produced articles, such as collages and albums, by combining multiple pictures. Japanese Patent Laid-Open No. 2006-287917 proposes an image output method where orientations of objects included in images are identified, layout of images in an output region is performed based on the identified orientations of objects, and the laid out images are output. Japanese Patent Laid-Open No. 2009-245071 proposes creating a basic layout to place multiple images, creating layout candidates in which the number of laid out images and so forth have been changed from the basic layout, and designating an optimal layout.

However, in the method described in Japanese Patent Laid-Open No. 2006-287917, a layout is generated by placing images matching a predetermined orientation stipulated for the template. Such a method of selecting an image group matching conditions designated for the template means that no layout can be generated outside of the conditions stipulated for the template, so the user is restricted to obtaining layouts of the same sort of results, which is problematic. There is also a problem therein that suitable layouts which take advantage of characteristics of image groups cannot be created.

On the other hand, the method described in Japanese Patent Laid-Open No. 2009-245071 enables layout results of many variations to be obtained, but there has been a problem in that good layout results are not obtained in a case that a selected image is not a desirable image.

SUMMARY OF THE INVENTION

It has been found desirable to provide an apparatus and method enabling suitable layout results to be obtained with many variations.

According to an aspect of the present disclosure, an apparatus includes an acquisition unit configured to acquire an image group including at least one image; a creating unit configured to create a plurality of layout candidates, by selecting at least one image from an image group acquired by the acquisition unit, and arranging the selected at least one image; an evaluation unit configured to evaluate layout candidates created by the creating unit; a deciding unit configured to decide a presentation order of a plurality of selected layout candidates, based on evaluation results from the evaluation unit; and a presenting unit configured to present layout candidates in the presentation order decided by the deciding unit. The deciding unit decides the presentation order so that the presentation order is different from the order of evaluation values from the evaluation unit, based on the evaluation results of the evaluation unit.

Further features of the present disclosure will become apparent from the following description of exemplary embodiments with reference to the attached drawings.

BRIEF DESCRIPTION OF THE DRAWINGS

FIG. 9 is a diagram illustrating an example of a format for saving image analysis results.

FIG. 12 is a diagram illustrating an example of a format for saving person attribute information.

FIG. 14 is a diagram illustrating an example of a format for saving the layout template in FIG. 13.

FIG. 16 is a diagram illustrating an example of a format for saving the layout template in FIG. 15.

FIG. 19A regarding automatic trimming processing, FIG. 19B regarding a method to calculate brightness suitability, and FIG. 19C regarding a method to calculate saturation suitability.

FIG. 22 is a diagram illustrating an example of holding a decided theme and main character information.

FIG. 23 is a diagram illustrating an example of holding a decided theme and main character information.

FIG. 24 is a diagram illustrating an example of holding generated layout information.

DESCRIPTION OF THE EMBODIMENTS

Various exemplary embodiments, features, and aspects of the disclosure will be described in detail below with reference to the drawings.

First Embodiment

A first embodiment of the present disclosure will be described regarding automatically generating a layout output product using an input image group. It should be noted that the following description is but an exemplary illustration by way of an embodiment, and that the present disclosure is by no way restricted to the following embodiment.

Figure 1:
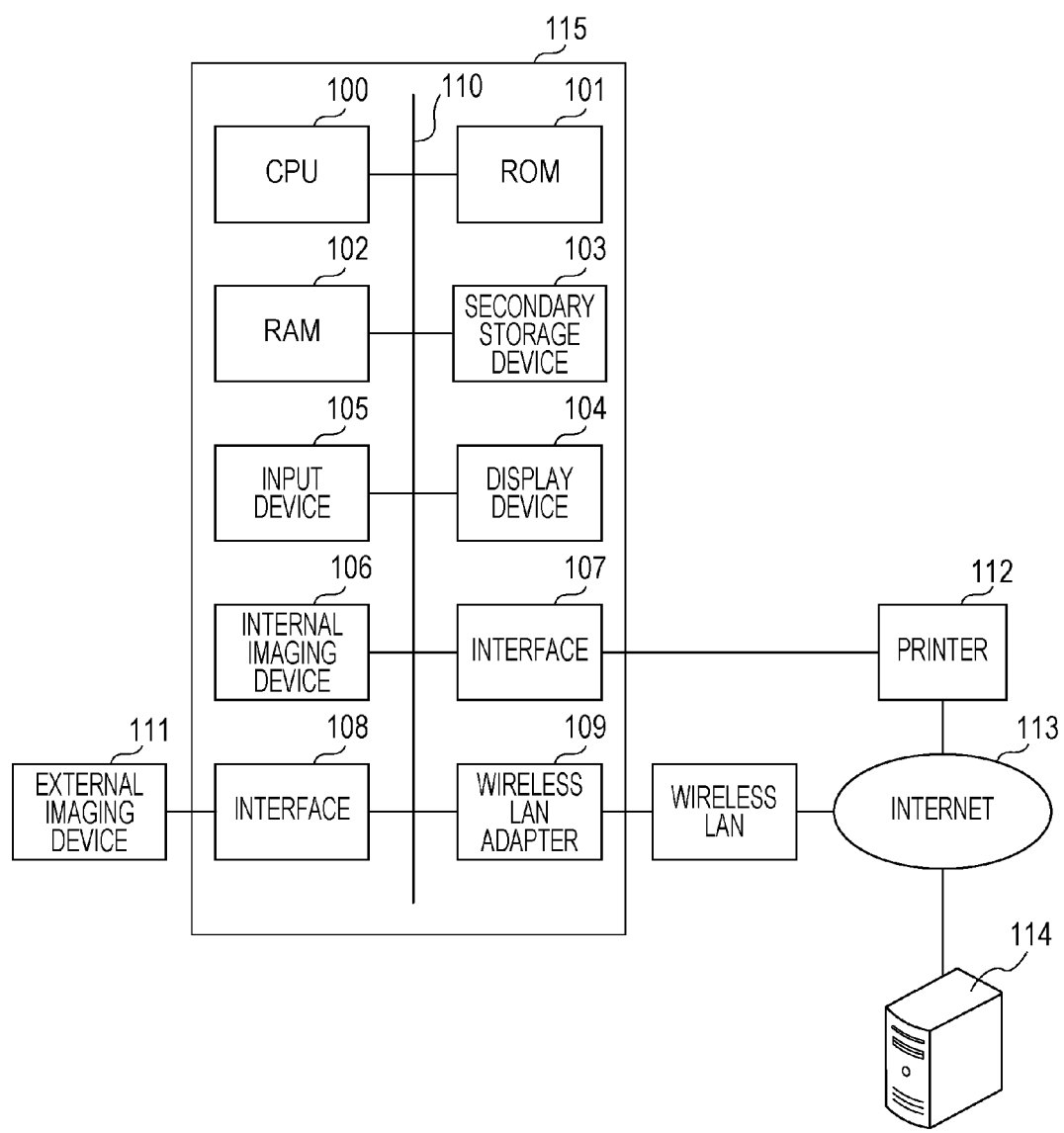
FIG. 1 is a hardware configuration diagram of an image processing apparatus according to a first embodiment.

FIG. 1 is a block diagram illustrating a hardware configuration example of an image processing apparatus according to the first embodiment. An image processing apparatus 115 in FIG. 1 includes a central processing unit (CPU) 100, read-only memory (ROM) 101, random access memory (RAM) 102, a secondary storage device 103, a display device 104, an input device 105, an internal imaging device 106, an interface 107, an interface 108, and a wireless LAN adapter 109. These components are mutually connected by a control bus/data bus 110. The wireless LAN adapter 109 is connected to a wireless LAN which exists at the location where the image processing apparatus 115 is installed. As used herein, the term "unit" generally refers to any combination of software, firmware, hardware, or other component that is used to effectuate a purpose.

The image processing apparatus 115 is a computer, for example. The CPU 100 executes information processing which will be described in the first embodiment, following programs. The ROM 101 stores programs such as an application which will be described below, which are executed by the CPU 100. The RAM 102 serves as memory to temporarily store various types of information when the CUP 100 is executing programs. The secondary storage device 103 is a storage medium which saves databases or the like in which are stored image files and image analysis results. A hard disk is one example of the secondary storage device 103. The display device 104 is a display monitor for example, which provides processing results of the first embodiment, a user interface (UI) described below, and so forth, to the user. The display device 104 may have touch panel functions. The input device 105 is a mouse, keyboard, or the like, for the user to input instructions such as processing for image correction, or the like.

Images that have been imaged by the internal imaging device 106 are subjected to predetermined image processing, and thereafter stored in the secondary storage device 103. The image processing apparatus 115 can also read in image data from an external imaging device 111 connected via an interface 108. The wireless LAN is further connected to the Internet 113 via an unshown modem/router, and thus the image processing apparatus 115 can acquire image data from an external server 114 connected to the Internet 113.

A printer 112 which outputs images and the like is connected to the image processing apparatus 115 via an interface 107. The printer 112 is further connected to the Internet 113, and can exchange print data with the image processing apparatus 115 either via the interface 107 or over the Internet 113 via the wireless LAN and wireless LAN adapter 109.

Figure 2:
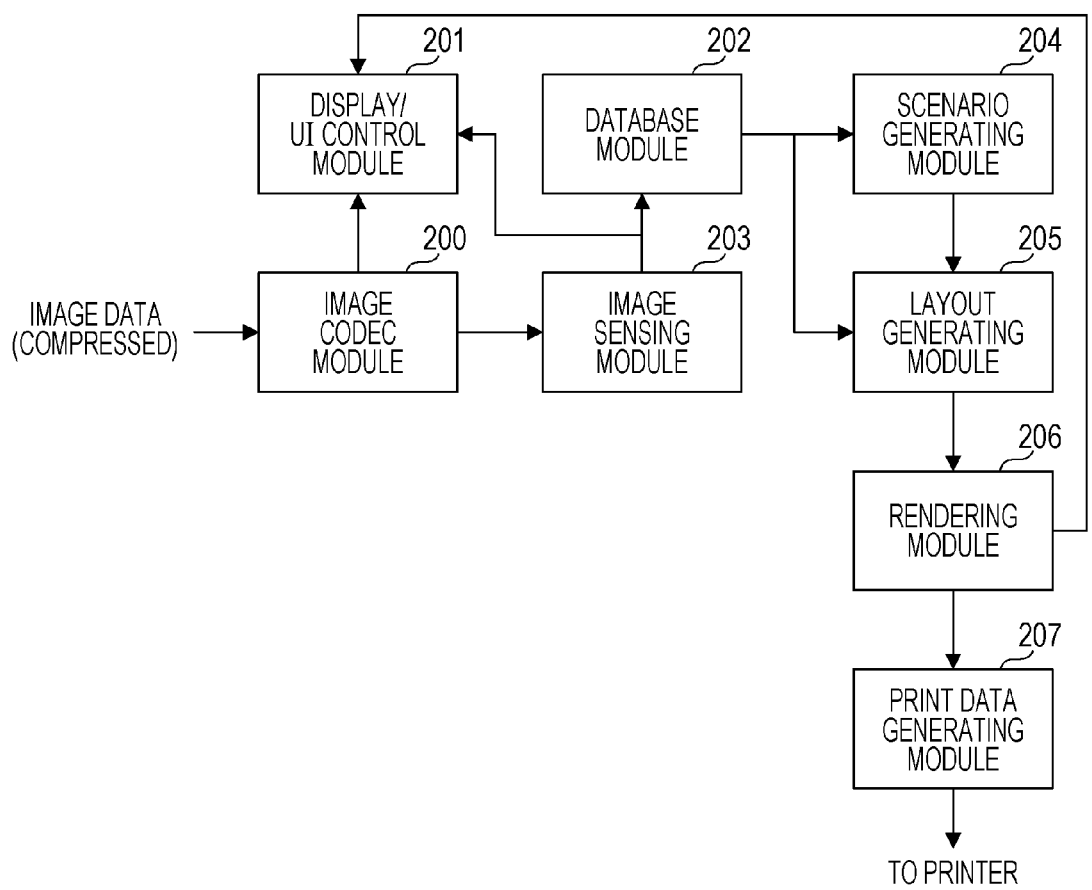
FIG. 2 is a software block diagram according to the first embodiment.

FIG. 2 is a block diagram illustrating the configuration of software, such as the aforementioned application and so forth, according to the present embodiment.

Image data acquired by the hardware is normally compressed according to a compression format such as Joint Photography Expert Group (JPEG) or the like. Accordingly, an image codec module 200 decompresses the image data according to the compression format by which the image data was compressed, and converts the image data into RGB point-sequential bitmap format image data. The converted bitmap data is transmitted to a display/UI control module 201, and is displayed on the display device 104 such as a display monitor or the like.

The bitmap data is further input to an image sensing module 203, and there is subjected to various types of image analysis processing, detailed description of which will be given later. Various types of attribute information of the image obtained in this analysis processing are saved in a predetermined format in the above-described secondary storage device 103, by a database module 202. Hereinafter, the terms "image analysis processing" and "sensing processing" will be used interchangeably.

A scenario generating module 204 generates layout conditions to be automatically generated, in accordance with various conditions which the user has input. A layout generating module 205 performs processing to automatically generate a layout following the scenario which has been generated.

The generated layout is used to generate display bitmap data at a rendering module 206. The bitmap data is sent to the display/UI control module 201, and the results are displayed on the display device 104, which is a display monitor or the like. On the other hand, the rendering results are further sent to a print data generating module 207, there converted into print command data for printers, and sent to a printer.

Figure 3:
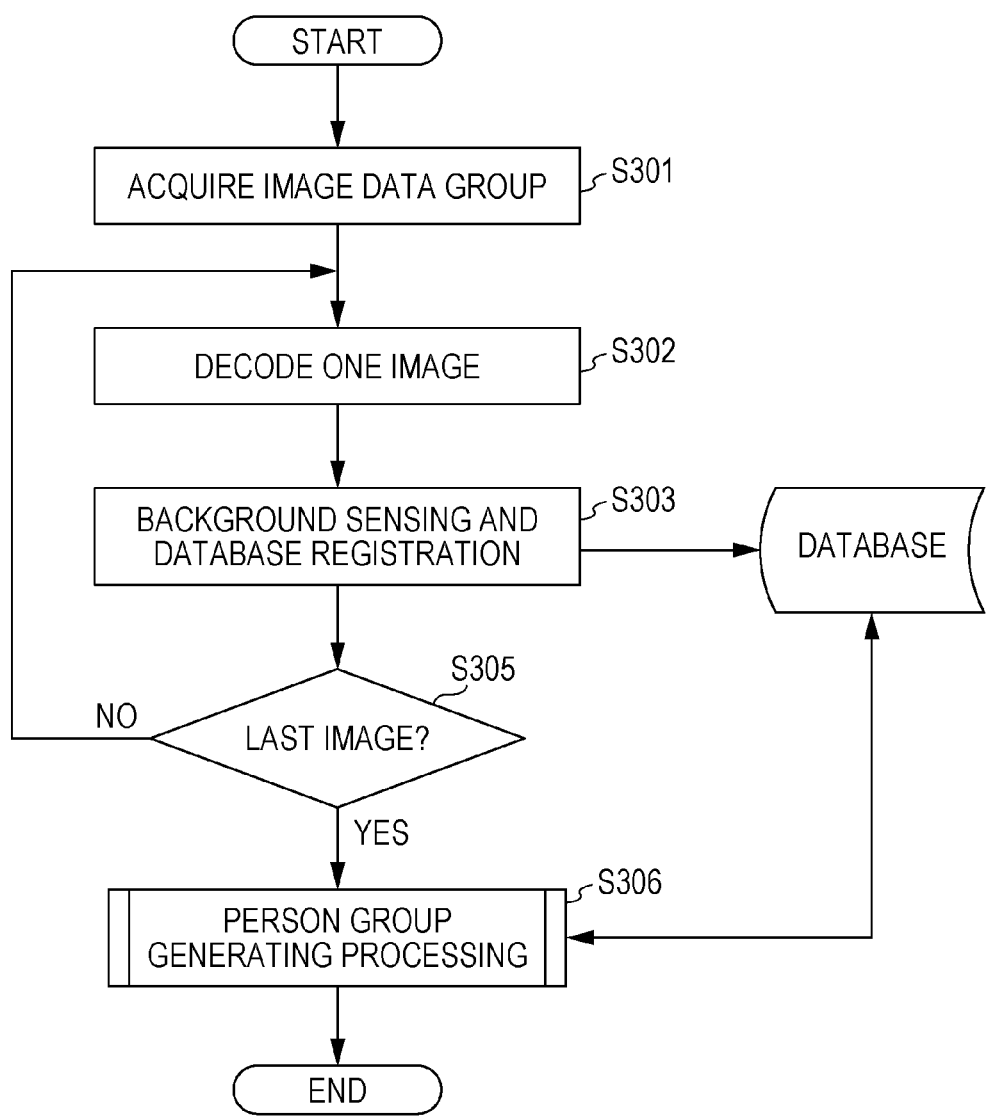
FIG. 3 is a flowchart illustrating image analysis processing according to the first embodiment.
Figure 4:
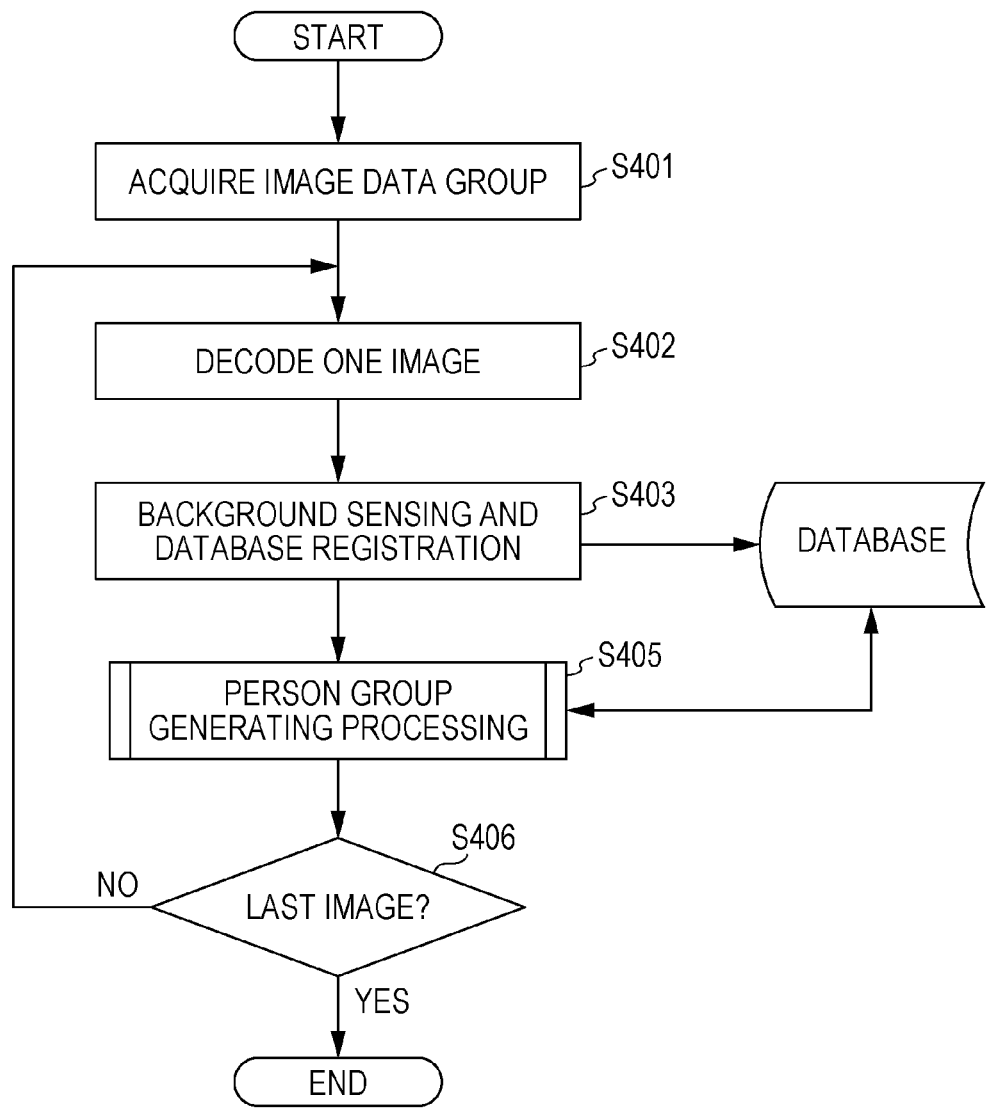
FIG. 4 is a flowchart illustrating image analysis processing according to the first embodiment.
Figure 5:
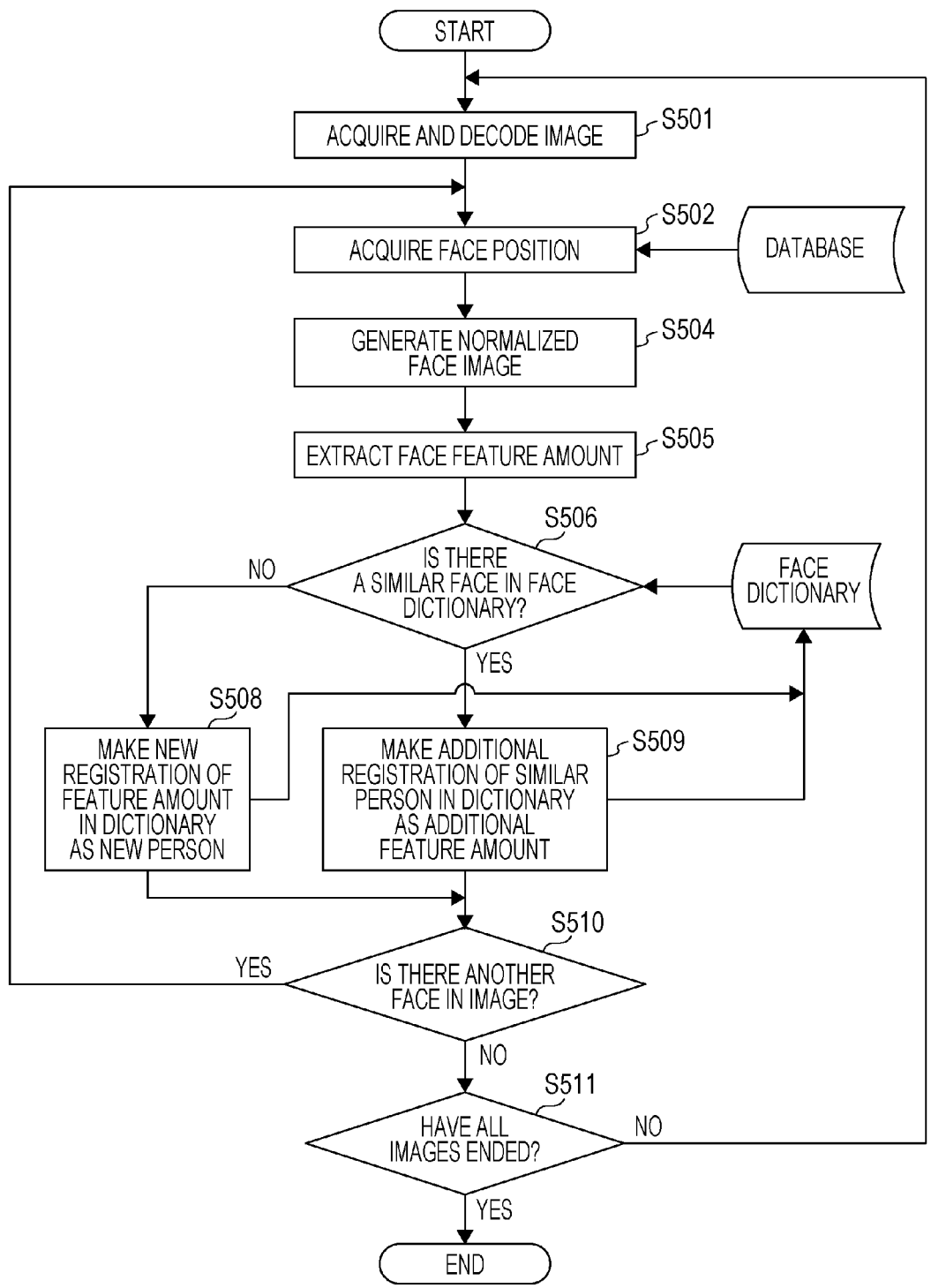
FIG. 5 is a flowchart illustrating person group generating processing according to the first embodiment.
Figure 6:
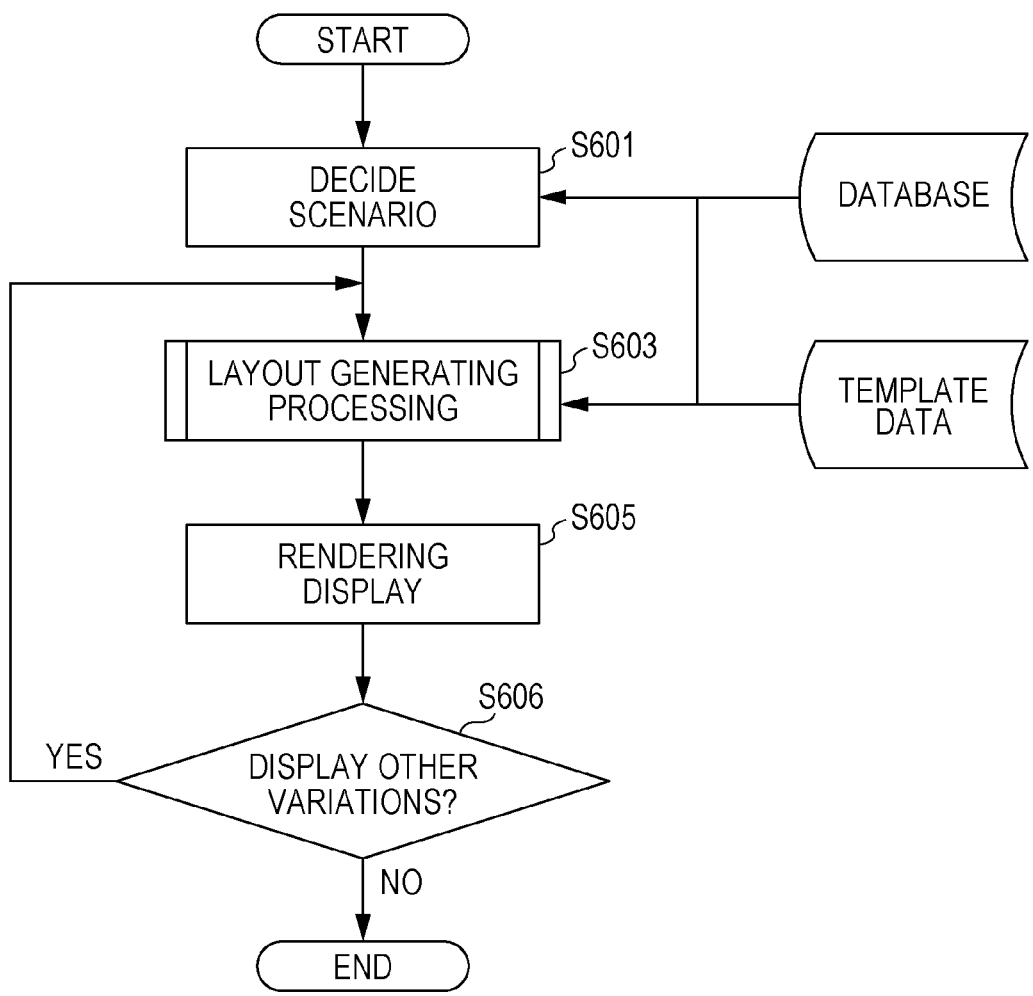
FIG. 6 is a flowchart illustrating automatic layout proposal processing according to the first embodiment.

FIGS. 3 through 6 are basic image processing flowcharts of the application according to the present embodiment. More specifically, FIGS. 3 and 4 illustrate a flow including processing performed before and after the processing performed at the image sensing module 203, where multiple image data groups including one or more images are acquired, analysis processing is performed on each image, and the results are stored in a database. FIG. 5 illustrates a flow of processing to group face information considered to be the same person, based on detected face position information. FIG. 6 illustrates a flow of processing to decide a scenario for layout creation based on image analysis information and various types of information which the user has input, and to automatically generate a layout based on the scenario.

In S301 in FIG. 3, one or more image data groups including one or more images are acquired. Examples of the way in which the image data group is acquired include the user connecting to the image processing apparatus 115 an imaging device or memory card storing images which have been shot, so that the images are read in. Other examples include acquiring an image data group of images which have been shot by an internal imaging device and saved in the secondary storage device 103, and acquiring an image data group from a location other than the image processing apparatus 115, such as from an external server 114 on the Internet, for example, via wireless LAN or the like.

Figure 8A:
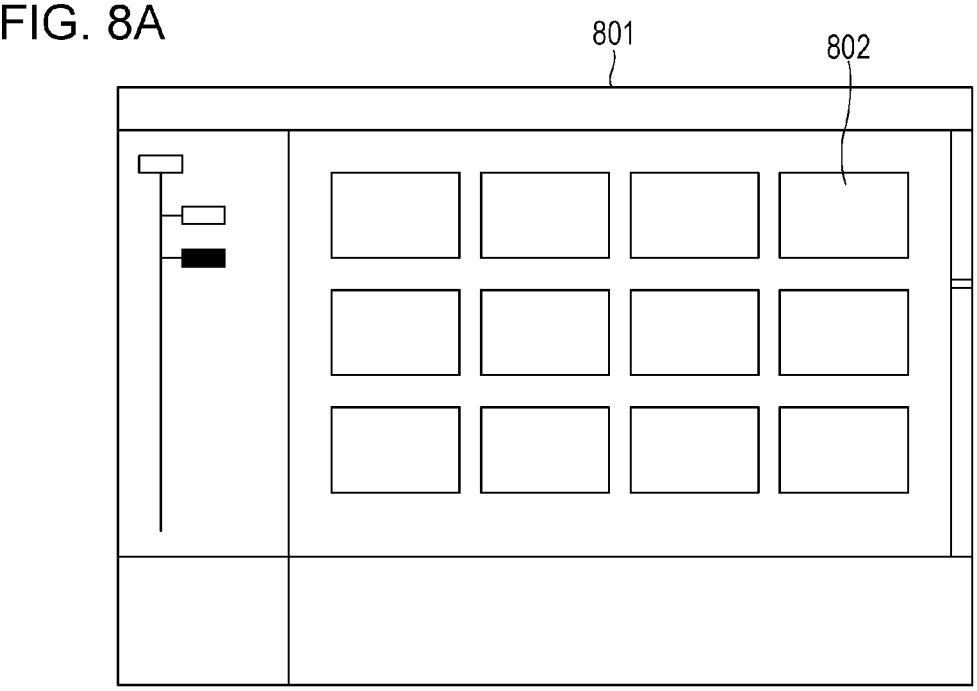
FIGS. 8A and 8B are diagrams illustrating display examples of image groups according to the first embodiment.
Figure 8B:
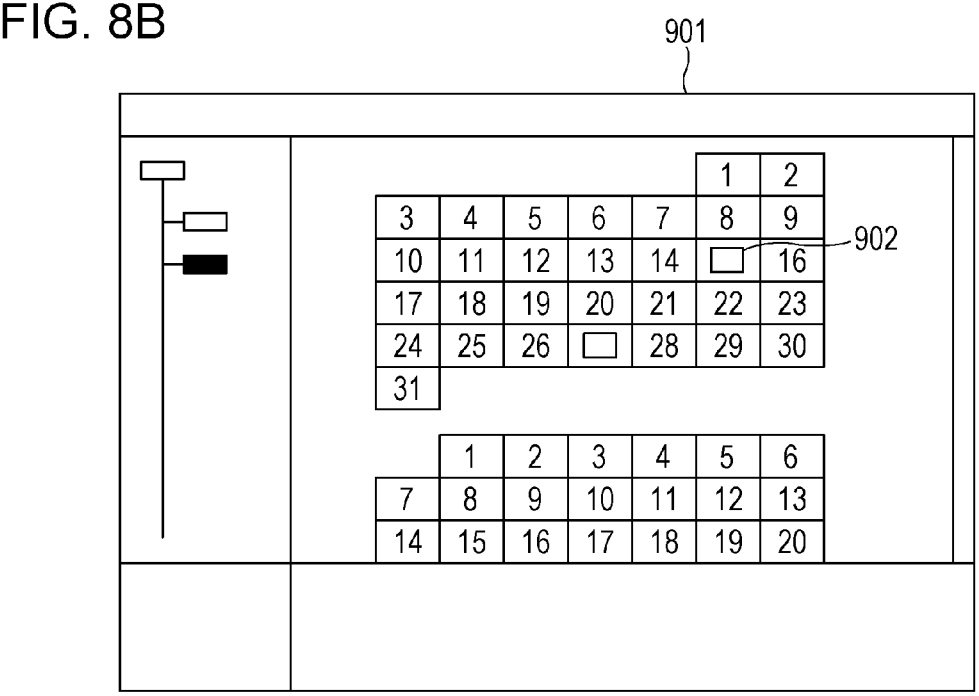

Upon acquiring the image data group, a thumbnail group thereof is displayed on the UI as illustrated in FIGS. 8A and 8B. FIG. 8A illustrates a UI 801 where image thumbnails 802 are displayed in increments of folders where the images are stored in the secondary storage device 103. FIG. 8B illustrates an arrangement where image data is managed by date in a UI 901 formed like a calendar. Clicking on a date portion 902 brings up a thumbnail list of images taken on that date, such as illustrated in FIG. 8A.

Next, the images are decoded in S302. More specifically, an application searches for images which have been newly saved and not subjected to sensing processing yet, and the extracted images are converted from compressed data into bitmap data by the image codec module 200.

Next, in S303 the bitmap data is subjected to various types of sensing processing. The term sensing processing as used here includes the various types of processing illustrated in Table 1. Examples of sensing processing in the present embodiment that are given here are face detection, feature amount analysis of the image, and scene analysis. Data type results such as illustrated in Table 1 are calculated for each.

TABLE 1

Example of Attribute Information Obtained as Result of Image Analysis

| General sensing classification | Detailed sensing classification | Data type | Value |
|---|---|---|---|
| Basic feature amount of image | Average luminance | int | 0 to 255 |
| | Average saturation | int | 0 to 255 |
| | Average hue | int | 0 to 359 |
| Face detection | Number of faces | int | 0 to MAXFACE |
| | Coordinate position | int * 8 | 0 to Width or Height |
| | Average Y in face region | int | 0 to 255 |
| | Average Cb in face region | int | −128 to 127 |
| | Average Cr in face region | int | −128 to 127 |
| Scene analysis | Scene results | char | Landscape Nightscape Portrait Underexposure Others |

Each sensing processing will be described. The overall average luminance and average saturation, which are basic feature amounts of the image, can be obtained by known methods, so detailed description thereof will be omitted. The average luminance for each pixel in the image can be obtained by converting (conversion expression omitted from description here) RGB components into known luminance/color-difference components (e.g., YCbCr components), and calculating the average value of the Y component. The average saturation can be obtained by calculating S in the following Expression for each pixel regarding the aforementioned CbCr, and then calculating the average of all S's.

$$S = \sqrt{Cb^2 + Cr^2}$$

The average hue (AveH) in the image is a feature amount to evaluate the shade of color of the image. The hue of each pixel can be calculated using a known hue intensity saturation (HIS) conversion expression, and AveH can be obtained by averaging the obtained values of the entire image. These feature amounts may be calculated for the entire image as described above, or the image may be divided into regions of predetermined sizes and the feature amounts calculated for each region.

Next, person face detection processing will be described. Known methods can be used as a person face detection technique employed in the present embodiment.

Japanese Patent Laid-Open No. 2002-183731 describes a method where eye regions are detected from an input image, and around the eye regions are taken as a face candidate region. The luminance gradient and weight of luminance gradient for each pixel are calculated with regard to the face candidate region, and these values are compared with the gradient of an ideal face reference image, and gradient weight thereof, that have been set beforehand. If the average angle between the gradients is not greater than a predetermined threshold value, the input image is determined to include a face region.

Japanese Patent Laid-Open No. 2003-30667 describes a method where a skin color region is first detected from the image, and the position of eyes can be detected in this region by detecting pixels having the color of the human iris.

Japanese Patent Laid-Open No. 8-63597 describes a method where a degree of matching is calculated between multiple templates having shapes of faces, and an image. The template of which the degree of matching is the highest is selected, and if the highest degree of matching is not smaller than a predetermined threshold value, the region within the selected template is set as a face candidate region. The position of the eyes can be detected using the same template.

Further, Japanese Patent Laid-Open No. 2000-105829 describes a method where first, a nose image pattern is used as a template, and a position in the entire image or in a region specified within the image is scanned, and a position which matches the template best is output as a nose position. Next, the region above the nose position in the image is considered to be the region where eyes exist, so this eye-existing region is scanned using an eye image pattern as a template and the degree of matching is calculated. An eye-existing candidate position set, which is a set of pixels in which the degree of matching is greater than a certain threshold value, is thus obtained. Continuous regions included in this eye-existing candidate position set are divided as clusters, and the distance between each cluster and the nose position is calculated. The cluster regarding which the distance is the shortest is determined to be the eye position, whereby organ position detection can be realized.

Other methods to detect faces of persons include the methods to detect faces and organ positions such as described in Japanese Patent Laid-Open Nos. 8-77334, 2001-216515, 5-197793, 11-53525, 2000-132688, 2000-235648, and 11-250267. The person face detection processing method is not restricted in particular, and the method described in Japanese Patent No. 2541688 may be employed.

Person face detection processing enables the number of faces and the coordinate positions of each face to be obtained for each input image. Finding the face coordinate position in the image enables the feature amount of the face region to be analyzed. For example, obtaining the average YCbCr value of the pixel values included in the face region, for each face region, allows the average luminance and average color difference to be obtained for the face regions.

Also, scene analysis processing can be performed using feature amounts of images. This scene analysis processing can be carried out by methods disclosed in Japanese Patent Laid-Open Nos. 2010-251999 and 2010-273144, for example. Scene analysis processing enables IDs to be obtained which distinguish photography scenes, such as Landscape, Nightscape, Portrait, Underexposure, and Others. While sensing information is acquired by the above-described sensing processing in the present embodiment, other sensing information may be utilized as well.

The sensing information thus acquired is saved in the database module 202. The sensing information may be described in a general-purpose format such as eXtensible Markup Language (XML) for example, such as illustrated in FIG. 9, and stored in the database module 202 in this format. FIG. 9 illustrates an example of describing attribute information for each image divided into three categories.

The first is the BaseInfo tag. This is a tag to store information added to an image file acquired beforehand, such as image size and photography date/time information. This tag includes an identifier (ID) for each image, the location where the image file is stored, image size, photography date/time, and so forth.

The second is the SensInfo tag. This is a tag to store the results of the above-described image analysis processing. Stored here are the average luminance, average saturation, average hue, and scene analysis results, for the entire image. Also stored here are face positions of persons in the image, and information relating to face color.

The third is the UserInfo tag. This is a tag to store information which the user has input for each image. Details of this tag will be described later.

The method of storing image attribute information in a database is not restricted to the above-described method. Any other known format may be used.

In S305 in FIG. 3, determination is made whether or not the image processed in S302 and S303 above is the last image in the image data group. If the last image, the flow advances to S306, and otherwise, returns to S302.

In S306, processing to generate a group for each person is performed using the face position information detected in S303. Automatic grouping of person faces beforehand enables efficient tagging of persons by the user later.

Forming person groups here is executed by the processing flow illustrated in FIG. 5, using a known personal recognition method. Such personal recognition processing is executed by extracting feature amounts of facial organs, such as the eyes and the mouth, and comparing the similarity in the relationship therebetween. An example of personal recognition processing is disclosed in Japanese Patent No. 3469031, so detailed description will be omitted here.

FIG. 5 is a basic flowchart of the person group generating processing in S306. First, in S501, images saved in the secondary storage device 103 are sequentially read out and decoded. In S502, the database module 202 is accessed so as to acquire the number of faces included in the image being processed and the positional information regarding the faces. Next, in S504, a normalized face image is generated, to perform personal recognition processing.

The term "normalized face image" here refers to a face image obtained by cropping out faces which exist in the image, and performing conversion on these faces, which have various sizes, orientations, and resolutions, so that the sizes and orientations are all the same. The positions of organs such as the eyes and mouth are important to perform personal recognition, so the size of normalized face images preferably is such that these organs can be accurately recognized. Generating such a normalized face image does away with the need to handle faces of various resolutions in the feature amount detecting processing.

Next, in S505, face feature amounts are calculated from the normalized face images. Face feature amounts are features including the position and size of organs such as the eyes, mouth, and nose, and further including facial outline and so forth.

Further, in S506, it is determined whether or not feature amounts of faces in the image currently being processed have similarity with face feature amounts in a database in which are stored face feature amounts for each person identifier (dictionary ID) beforehand (hereinafter referred to as "face dictionary"). This similarity is calculated by comparing feature amounts managed within the dictionary ID, and feature amounts newly input. The feature amounts used at this time is information of the position of organs such as the eyes, nose, and mouth, the distance between the organs, and so forth, that is held. The greater the similarity between the feature amounts is, the higher the degree of similarity is, and less similarity there is between the feature amounts, the lower the degree of similarity is. The degree of similarity may assume a value between 0 and 100. Whether similar or not is determined by comparing the calculated degree of similarity with a preset threshold value, determining that the face is of the same person as that of the dictionary ID in a case where the degree of similarity exceeds the threshold value, and determining that the face is not of the same person in a case where the degree of similarity does not exceed the threshold value. This threshold value may be uniform for all dictionary IDs, or may be set differently for each dictionary ID.

In a case where the determination in S506 is Yes, the flow advances to S509, where the feature amounts of this face are added to the dictionary ID as the same person.

In a case where the determination in S506 is No, the flow advances to S508, where a new dictionary ID is issued and added to the face dictionary, since the face currently being evaluated is determined to be a person different from any person registered in the face dictionary so far. The processing of S502 through S509 is applied to all face regions detected from the input image group, thus groping the persons appearing in that image.

The results of the person group generating processing are described using ID tags for each face as illustrated in the XML format in FIG. 12, and saved in the above-described database.

While description has been made above regarding an arrangement where person group generating processing is executed after sensing processing has been completed for all images, as illustrated in FIG. 3, this is not restrictive, and an arrangement may be made such as illustrated in FIG. 4 for example, where sensing processing is performed on one image in S403, following which grouping processing is performed in S405 using the face detection position information, and these tasks are repeated. Either way, the same results can be generated.

Figure 7:
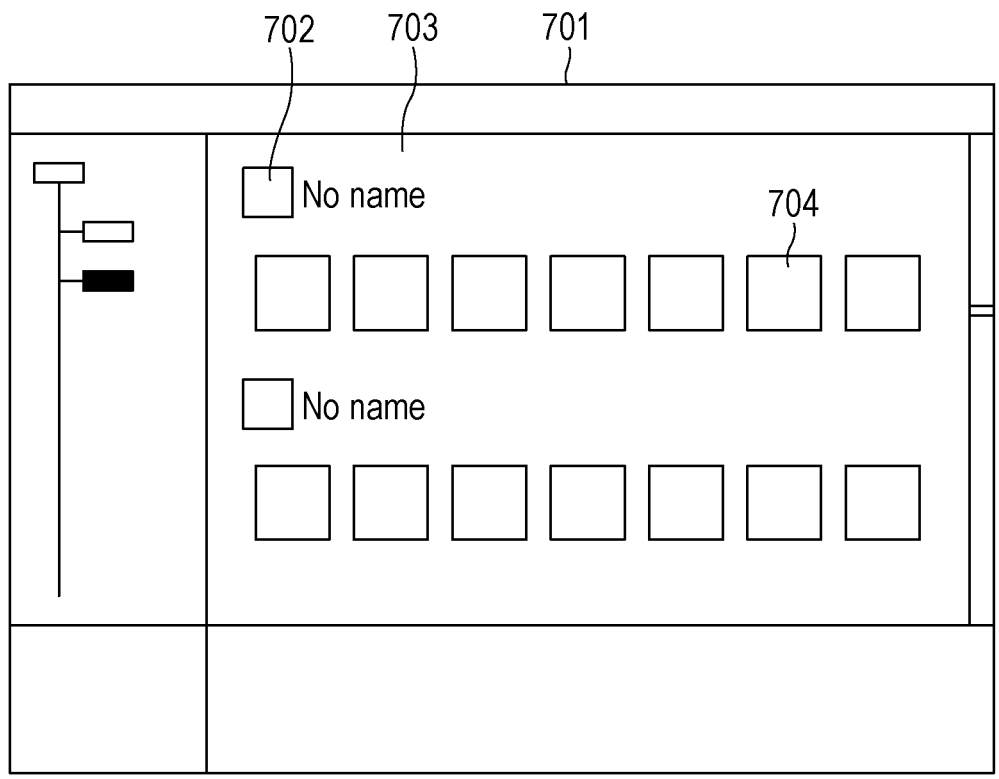
FIG. 7 is a diagram illustrating a display example of a person group according to the first embodiment.

The person groups obtained from this person group generating processing are displayed in a UI 701 such as illustrated in FIG. 7. In FIG. 7, reference numeral 702 denotes a representative face image of a person group, and reference numeral 703 denotes a region to the side thereof where the name of this person group is displayed. Immediately after the automatic person grouping processing ends, the person names are displayed as "No name 1", "No name 2", and so forth, as illustrated in FIG. 7. These person names will hereinafter be referred to as "person ID". Reference numeral 704 denotes the multiple face images included in the person group. The UI 701 in FIG. 7 is capable of receiving input of person names upon having specified a region 703 for "No name X", input of information for each person, such as birthday, relation, and so forth.

The above-described sensing processing may be performed using background tasking of the operating system. In this case, the user can continue the sensing processing of the image group even if performing a different task on the computer.

Various types of attribute information relating to the image can be manually input by the user in the present embodiment. Table 2 illustrates examples of such attribute information (hereinafter "manually registered information") in list form. There are two general classifications in this manually registered information, one of which is very general and relates to settings for the overall image, and the other is information to be set for individual persons subjected to the above-described group processing.

TABLE 2

Example of Attribute Information which User can Manually Input

| Classification | Information | Data type | Value |
|---|---|---|---|
| Image | Rating | int | 0 to 5 |
| | Event | char | "travel" |
| | | | "graduation" |
| | | | "wedding" |
| Person | Name | char | "NAME" |
| | Birthday | char | YYYYMMDD |
| | Relationship | char | "family" |

Figure 10A:
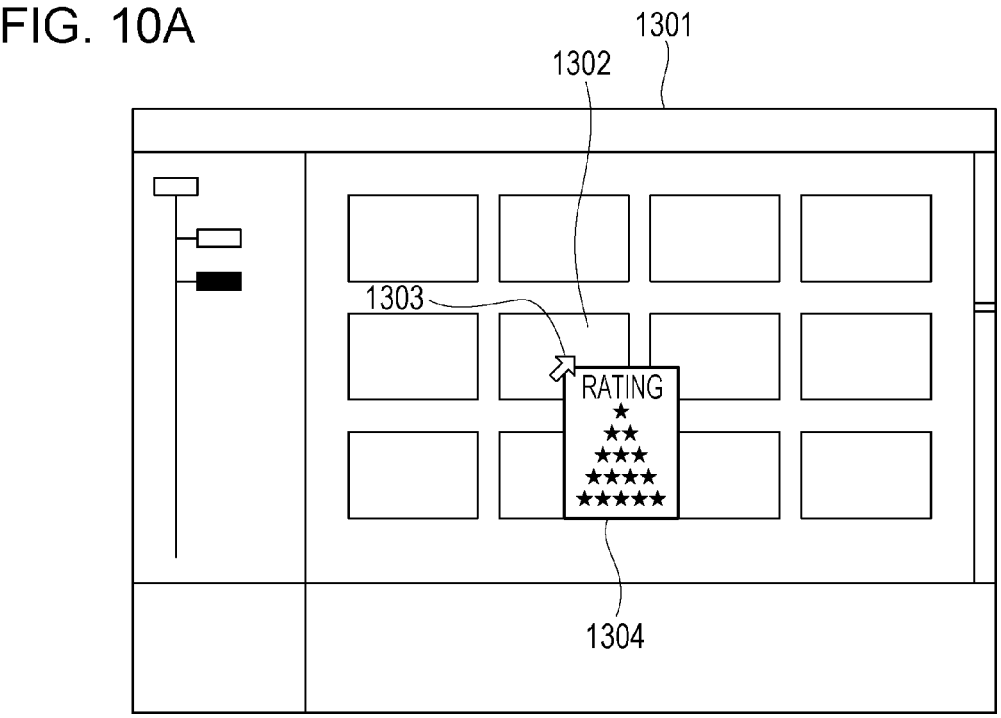
FIGS. 10A and 10B are diagrams illustrating an example of a user interface (UI) for manually inputting ratings, and an example of a UI for manually inputting event information.

One attribute information set for each image is a rating manually set by the user, to indicate how high he/she rates the image, on a scale of several levels. For example, FIG. 10A illustrates a UI 1301 where the user can select a desired thumbnail image 1302 with a mouse pointer 1303, and right-click to bring up a dialog box from which the user can input a rating. The arrangement illustrated in FIG. 10A involves selecting a number of stars from a menu in accordance with the rating. In the present embodiment, the higher the rating is, the more stars the user selects.

Alternatively, the rating may be set automatically, rather than the user setting the rating manually. For example, an arrangement may be made where the user clicks a desired image file in the state of the image thumbnail list display in FIG. 8A to transition to a single-image display screen, and the rating is set according to a count of the number of times that this transition has been made. Determination may be made that the greater the number of times counted which the user has viewed the image, the more the user likes this image, and accordingly the higher the rating is, for example.

As another example, the number of times of printout may be set for the rating. For example, if a user prints an image, it may be assumed that the user is printing that image because he/she likes that image, so the rating is set higher. Determination may be made that the greater the count of prints, the more the user likes this image, and accordingly the higher the rating is, for example.

As described above, the rating may be set manually by the user, or may be automatically set depending on the number of times of views or the number of prints. Information of these settings and counts are individually stored in the UserInfo tag of the database module 202, in the XML format illustrated in FIG. 9. For example, the rating is stored in a FavoriteRate tag, the viewing count is stored in a ViewingTimes tag, and the print count is stored in a PrintingTimes tag.

An example of information to be set for each image is event information, examples of which are "travel" indicating a family vacation trip, "graduation", "wedding", and so on.

Figure 10B:
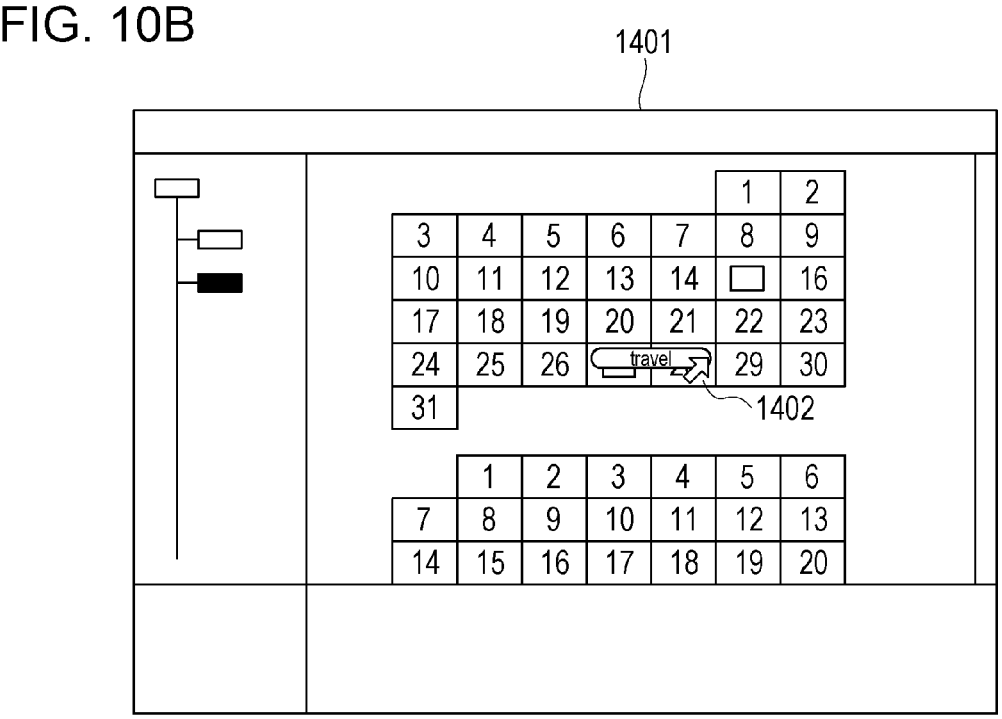

An event may be specified by specifying a desired date on the calendar by the mouse pointer 1402 such as illustrated in FIG. 10B, and inputting the name of the event for that date. The specified event name will be included in the XML format illustrated in FIG. 9, as a part of the attribute information of that image. The format in FIG. 9 associates the event name and the image using an Event tag in the UserInfo tag. Note that hereinafter, the term "associate" means to correlate.

Figure 11:
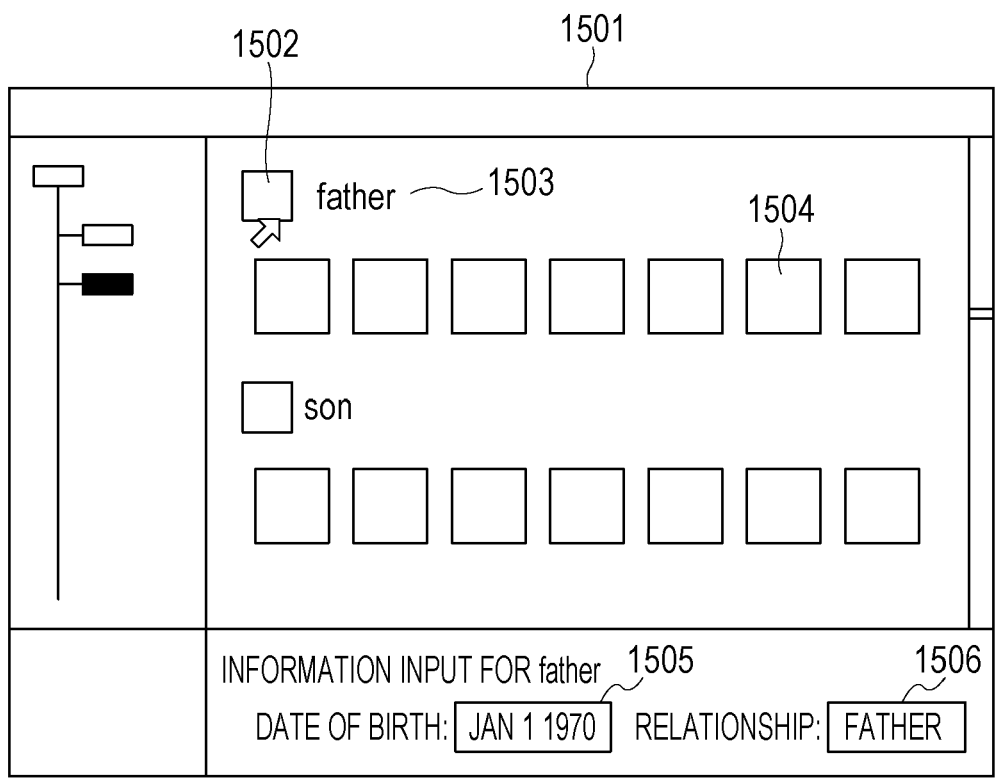
FIG. 11 is a diagram illustrating an example of a UI for manually inputting person attribute information.

Next, person attribute information will be described. FIG. 11 illustrates an UI 1501 for inputting person attribute information. Reference numeral 1502 in FIG. 11 denotes a representative face image of a certain person ("father" in this case). Reference numeral 1503 denotes a display region for a person name (person ID) of the certain person. Reference numeral 1504 denotes images (thumbnails) detected from other images, regarding which determination has been made in S506 that the face feature amounts are similar. Thus, a list of images 1504 regarding which determination has been made in S506 that the face feature amounts are similar, is displayed beneath the person ID 1503 in FIG. 11.

Immediately after the sensing processing has ended, there is no name input to each person group as illustrated in FIG. 7, but any person name can be input by instructing the "No name" portion 702 using a mouse pointer.

The birthday of each person, and the relationship as to the user operating the application, can be set as attribute information for each person. Clicking on the representative face 1502 of the person in FIG. 11 enables the birthday of the person clicked on to be input at a first input portion 1505 shown at the bottom of the screen. Relationship information as to the person clicked on can be input at a second input portion 1506.

This input person attribute information is managed in the database module 202 separately from the image attribute information, in an XML format such as illustrated in FIG. 12, unlike the attribute information correlated with the images in the previous description.

Figure 13:
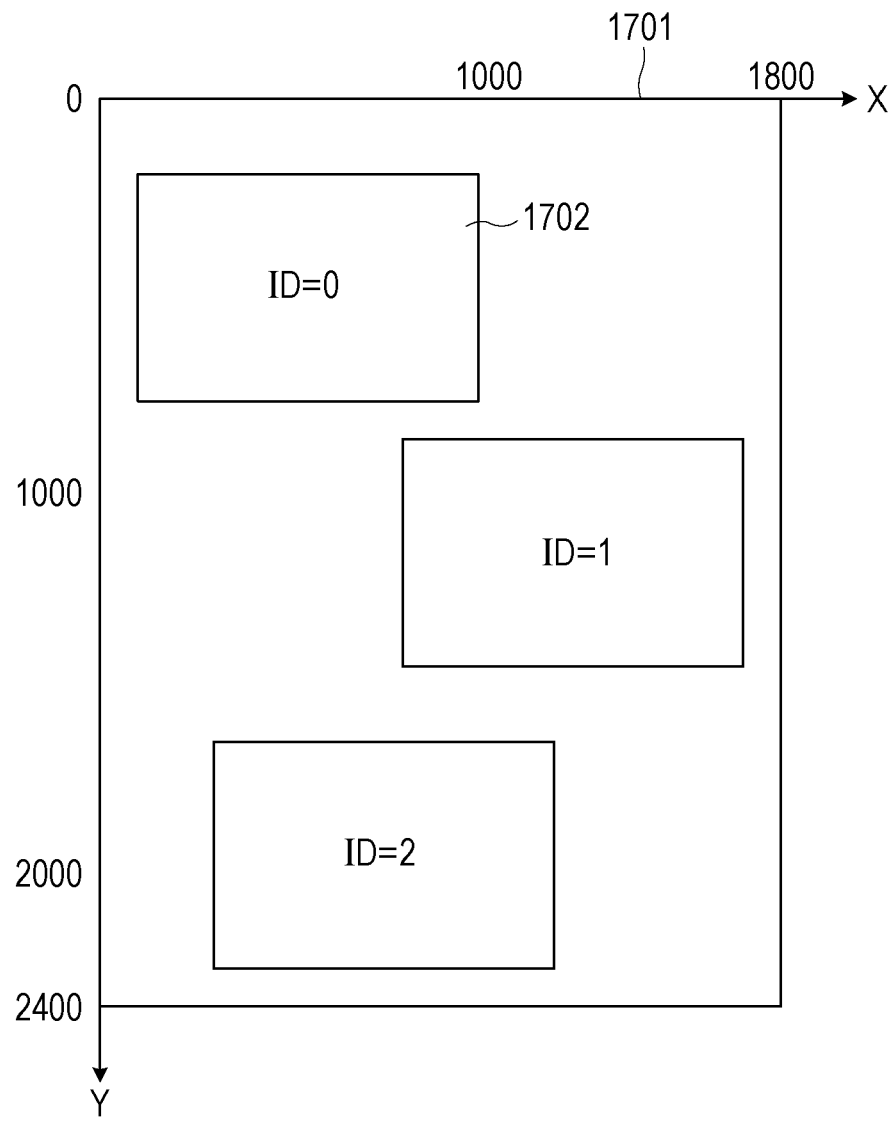
FIG. 13 is a diagram illustrating an example of a layout template.
Figure 15:
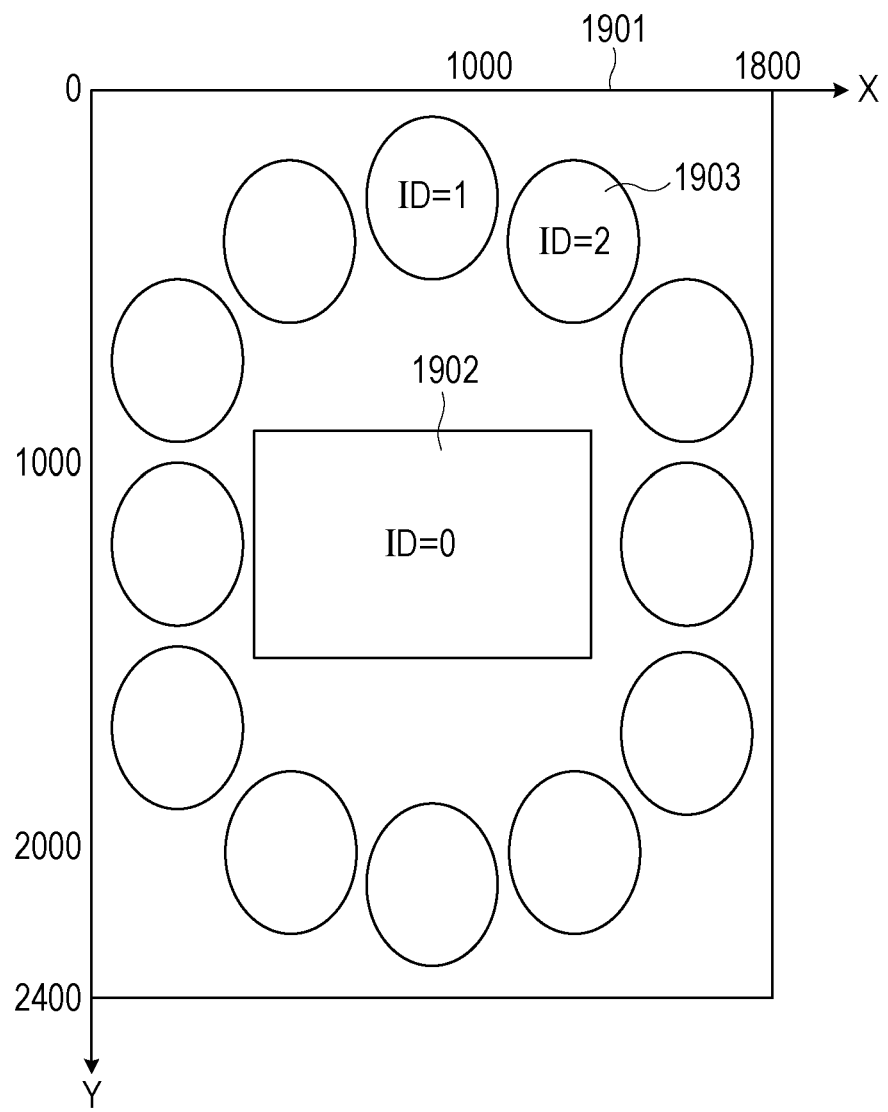
FIG. 15 is a diagram illustrating an example of a layout template.

Various layout templates prepared beforehand are used in the layout generating processing according to the present embodiment. Examples of layout templates are illustrated in FIGS. 13 and 15, where multiple image placement frames (hereinafter used interchangeably with the term "slots") 1702, 1902, and 1903 are provided in the size of a sheet for layout.

A great number of such templates are prepared; these may be saved in the secondary storage device 103 at the point that the software for carrying out the present embodiment is installed in the image processing apparatus 115. Another method is to obtain a desired template group from an external server 114 on the Internet, via the interface 107 or the wireless LAN adapter 109.

These templates are described in a highly versatile structured language, such as XML, in the same way as that used in storing the sensing results as described above. FIGS. 14 and 16 illustrate examples of XML data.

In these examples, first, basic information of the layout page is described at the BASIC tag. Conceivable examples of basic information include layout theme, page size, resolution (dpi) of the page, and so forth. In the initial state of the templates in these examples, a Theme tag, which is the layout theme, is blank. The default settings for the basic information are page size of A4 and resolution of 300 dpi.

ImageSlot tags describe information of the image placement frames described above. An ImageSlot tag includes the two tags of ID tag and POSITION tag, which describe the ID and position of the image placement frame thereof. This position information is defined on an X-Y coordinate system of which the upper left corner is the origin, for example, as illustrated in FIGS. 14 and 16.

The ImageSlot tags are also used to set, for each slot, the shape of the slot and a recommended person group name to be placed in the slot. The template illustrated in FIG. 13 has a rectangular shape for all slots, as indicated by "rectangle" in the Shape tag in FIG. 14, and the person group name is recommended to be "MainGroup" by the PersonGroup tag.

The template illustrated in FIG. 15 has a rectangular shape for the slot 1902 situated at the middle, of which ID=0, as indicated by "rectangle" in the first Shape tag in FIG. 16, and the person group name is recommended to be "SubGroup". The slots 1903 of which ID=1 and ID=2 have oval shapes, as indicated by "ellipse" in the second and third Shape tags in FIG. 16, and the person group name is recommended to be "MainGroup". Many such templates are held in the present embodiment.

The application according to the present embodiment is arranged to be able to perform analysis processing on input image groups, automatically group persons, and display on a UI. The user can view the results, input attribute information for each person group such as name and birthday, and set ratings for each of the images. Moreover, a great number of layout templates, classified by theme, can be held.

The application according the present embodiment which satisfies the above-described conditions performs processing to automatically generate a collage layout which the user might like, and presents this to the user, at a certain timing (hereinafter referred to as "layout proposal processing").

FIG. 6 illustrates a basic flowchart for performing layout proposal processing. First, in S601, a scenario for the layout proposal processing is decided. A scenario involves deciding the theme and template of the layout to be proposed, setting of a person to be emphasized in the layout (main character), selection information if an image group to be used for generating a layout, and so forth. Scenario deciding methods will now be described by exemplifying two scenarios.

For example, in one assumed case, settings have been made such that layout proposal processing is to be automatically performed two weeks before the birthday of each person, and a person "son" automatically grouped in FIG. 11 is close to his first birthday. In this case, the theme "growth", which is a growth record, is decided as the theme for the layout to be proposed. Next, a template suitable for a growth record, such as illustrated in FIG. 15 is selected, and "growth" is described in the XML Theme tag portion, as illustrated in FIG. 22. Next, "son" is set as the main character "MainGroup" to be emphasized in the layout. Further, "son" and "father" are set as the "SubGroup" to be secondarily emphasized in the layout. Thereafter an image group to be used in the layout is selected. In the case of this example, a great number of image groups including images including the person "son" is extracted from groups of images shot from the day on which the person "son" was born, up to the present, and compiled into a list. This is an example of deciding a scenario for a growth record layout.

As a different example, in another assumed case, settings have been made such that in a case where certain event information has been registered within one month, layout proposal processing is executed. Once it has been determined from the event information registered in FIG. 10B that the user has gone on a family vacation several days ago, for example, and there is a great number of images from that trip stored in the secondary storage device 103, the scenario generating module 204 decides a scenario for proposing a layout for the family vacation. In this case, "travel" is decided as the theme for the layout to be proposed for the vacation trip. Next, a template having a layout such as illustrated in FIG. 13 is selected, and "travel" is described in the XML Theme tag portion, as illustrated in FIG. 23. Next, "son", "mother", and "father" are set as the main character "MainGroup" to be emphasized in the layout. Thus, XML features can be employed to set multiple persons as the "MainGroup". Thereafter, an image group to be used in the layout is selected. In the case of this example, the database is referenced, and a great number of image groups including a great number of images associated with the vacation event is extracted and compiled into a list. This is an example of deciding a scenario for a family vacation layout.

Figure 17:
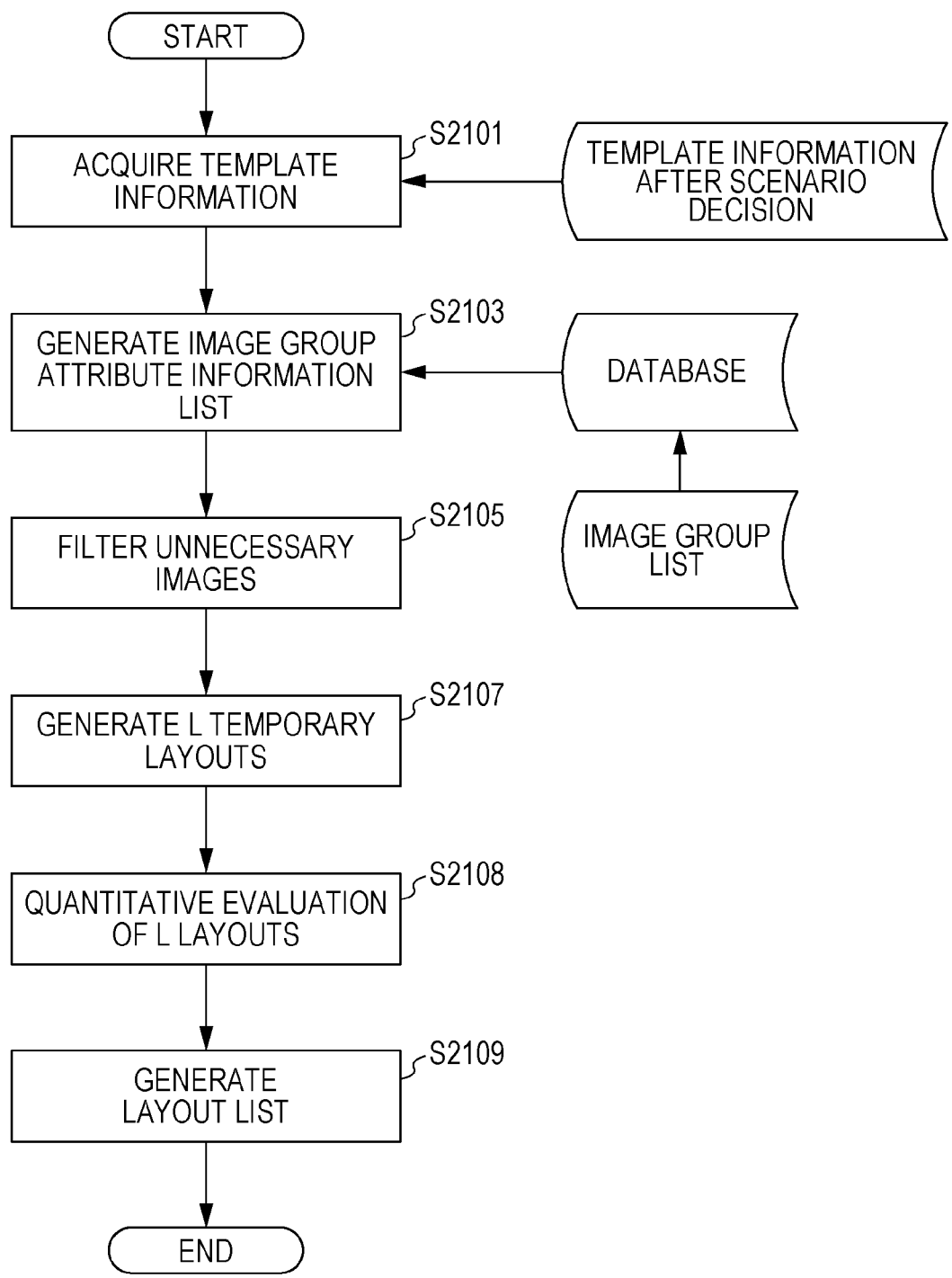
FIG. 17 is a flowchart illustrating automatic layout generating processing according to the first embodiment.

Next, automatic layout generating processing based on the above-described scenario is executed in S603 in FIG. 6. FIG. 17 illustrates a detailed processing flow of the layout generating module 205. The processing steps in FIG. 17 will now be described in order.

Template information decided in the above-described scenario deciding processing, after the theme and person group information have been set, is acquired in S2101.

Next, in S2103 feature amounts for each image are acquired from the database, based on the image list decided for the scenario as described above, and an image group attribute information list is generated. The image group attribute information list has a configuration where there are many IMAGEINFO tags illustrated in FIG. 9 arrayed as there are images in the image list.

Thus, image data itself is not directly handled in the automatic layout generating processing according to the present embodiment; rather, attribute information saved in a database from having performed sensing processing for each image beforehand, is used. This avoids the need for a very large memory region to store the image group, which would be necessary if the image data itself were handled at the time of performing the layout generating processing. This realizes reduction in the memory capacity needed for the layout generating processing.

Figure 18:
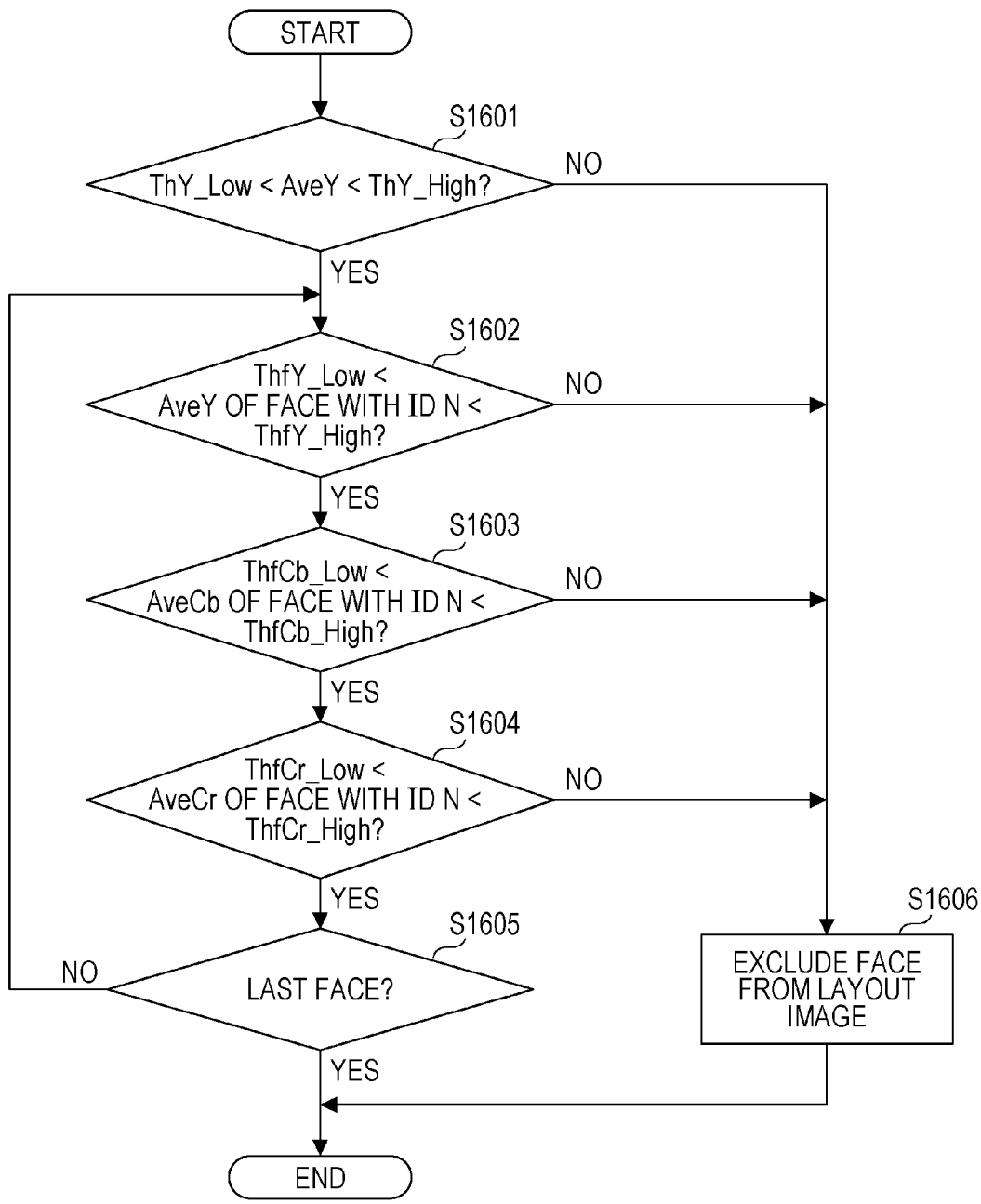
FIG. 18 is a flowchart illustrating unnecessary image filtering processing according to the first embodiment.

Specifically, attribute information of the input image group is first used in S2105 to perform filtering of unnecessary images from the input image group. The filtering processing is performed according to the flow illustrated in FIG. 18. First in S1601 in FIG. 18, determination is made for each image, regarding whether or not the average luminance thereof is included between threshold values (ThY_Low and ThY_High). If the determination results are No, the flow advances to S1606 where the image being handled (hereinafter "image of interest") is removed from being a layout candidate.

In the same way, the average luminance and average color difference components are determined for each face region included in the image of interest, regarding whether included between threshold values which indicate a good skin color region, S1602 through S1604. Only in a case where all determinations of S1602 through S1604 yield Yes is an image applied to the subsequent layout generating processing. Specifically, in S1602, determination is made regarding whether or not an AveY of a face region where ID=N is included in a range of predetermined thresholds (ThfY_Low and ThfY_High). In S1603, determination is made regarding whether or not an AveCb of a face region where ID=N is included in a range of predetermined thresholds (ThfCb_Low and ThfCb_High). In S1604, determination is made regarding whether or not an AveCr of a face region where ID=N is included in a range of predetermined thresholds (ThfCr_Low and ThfCr_High). In S1605, determination is made whether the last face or not. If not the last face, the flow returns to S1602, and if the last face, the processing ends.

This filtering processing is for removing images which clearly are unnecessary in the subsequent temporary layout creation processing, so the threshold values are preferably set relatively loosely. For example, if the difference between ThY_High and ThY_Low in the determination of overall image luminance in S1601 is drastically small as compared to the dynamic range of the images, the number of images which yield a Yes determination will be that much smaller. This is avoided in the filtering processing according to the present embodiment by setting the difference between the two thresholds as wide as possible while eliminating images which are clearly abnormal.

Next, a great number (L) of temporary layouts are generated in S2107 in FIG. 17, using the image group obtained for layout in the processing described above. Generating of the temporary layouts is performed by repeating processing of arbitrarily fitting the input images into the image placement frames of the acquired template. At this time, the parameters of image selection, placement, and trimming, are randomly decided, for example.

Figure 19A:
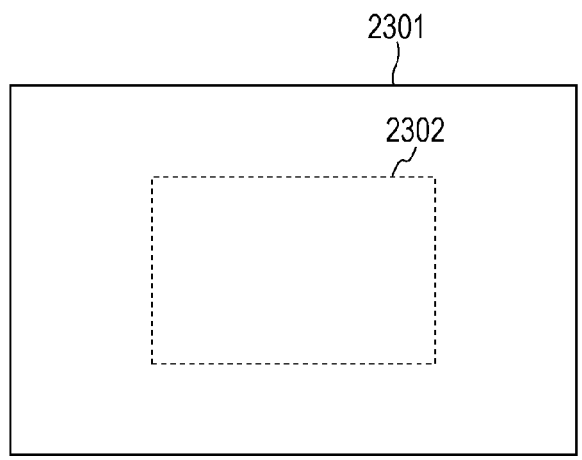
FIGS. 19A through 19C are explanatory diagrams.

An example of a standard for selecting images involves deciding which images to select from the image group when there are N image placement frames in the layout. An example of a standard for placement involves deciding which placement frames the selected multiple images are to be placed in. An example of a standard for trimming involves deciding a trimming ratio, which is how much to trim. The trimming ratio may be represented in terms of 0 to 100%, and trimming is performed at a predetermined trimming ratio with the center of the image as a reference, as illustrated in FIG. 19A. Reference numeral 2301 in FIG. 19A denotes the entire image, and 2302 denotes the frame where trimming has been performed at a trimming ratio of 50%.

As many temporary layouts as possible are generated based on the image selection, placement, and trimming standards. The temporary layouts that have been generated can be expressed as in the XML code illustrated in FIG. 24. The ID of the image selected for each slot is described in the ImageID tag, and the trimming ratio is described in the TrimmingRatio tag.

Note that the number L of temporary layouts generated here is decided by the processing amount of evaluation processing in a later-described layout evaluation step, and the capabilities of the image processing apparatus 115 performing the processing thereof. For example, several hundreds of thousands of temporary layouts are preferably generated.

The processing amount of evaluation processing in the layout evaluation step increases or decreases depending on how complex the layout template to be created is. For example, the greater the number of slots to be handled within the template is, the greater the evaluation processing amount becomes, and the more complex the layout conditions instructed for each slot are, the greater the evaluation processing amount becomes. Accordingly, the number L may be dynamically determined after having estimated the complexity of the template to be generated beforehand. Suitably setting the number L is this way enables the response at the time of automatic layout creating, and the quality of the layout results, to be optimally controlled.

The generated layouts may be saved as files in the secondary storage device 103 in the XML format illustrated in FIG. 24 with IDs appended to each, or may be stored in the RAM 102 using other data structures.

Qualitative evaluation of the great number of generated temporally layouts is then performed in S2108 in FIG. 17. Specifically, the L temporary layouts which have been created are each subjected to evaluation, using predetermined layout evaluation amounts. Table 3 illustrates an example of layout evaluation amounts in the present embodiment. The layout evaluation amounts according to the present embodiment can be primarily classified into three categories, as illustrated in Table 3.

TABLE 3

Example of Layout Evaluation Values in Automatic Layout

| Category | Evaluation items | Score range | Importance by theme (weighting W) | |
|---|---|---|---|---|
| | | | growth | travel ... |
| Evaluation of individual image | Suitability of brightness | 0 to 100 | 0.5 | 1.0 |
| | Suitability of saturation | 0 to 100 | 0.5 | 1.0 |
| Evaluation of image and slot match | Person match | 0 to 100 | 1.0 | 0.5 |
| | Determination of trimming omission | 0 to 100 | 1.0 | 0.5 |
| Evaluation of balance in page | Image similarity | 0 to 100 | 0.5 | 1.0 |
| | Variation in shade of color | 0 to 100 | 0.5 | 1.0 |
| | Variation in face size | 0 to 100 | 0.5 | 1.0 |
| Other | User preferences | 0 to 100 | 0.8 | 0.8 |

Figure 19B:
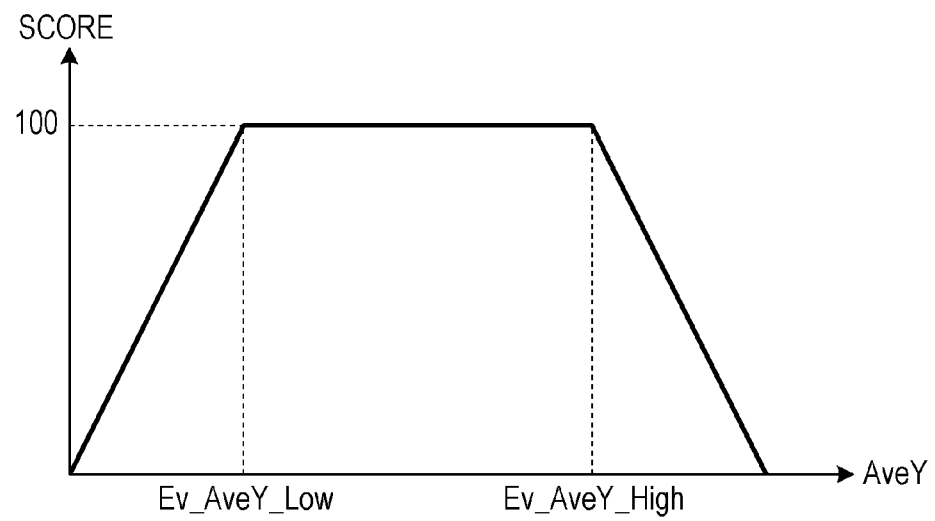
Figure 19C:
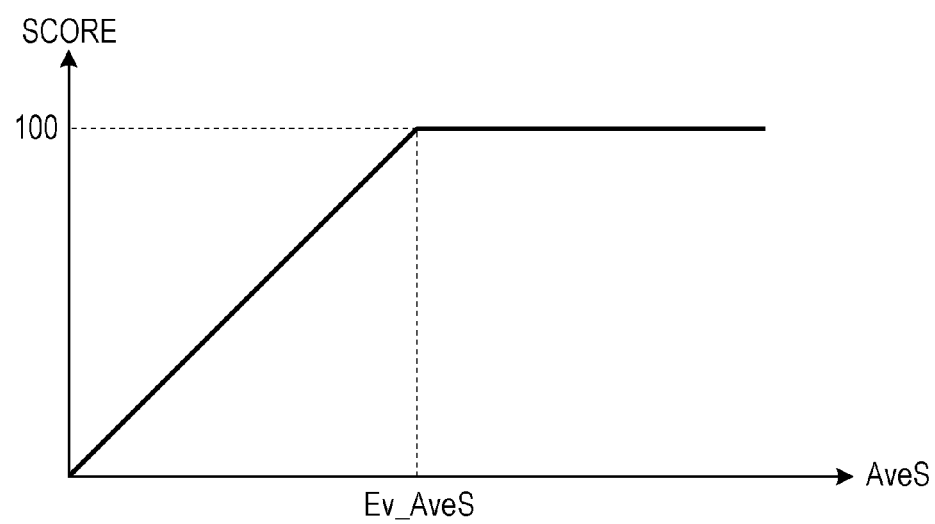

The first is evaluation amounts of individual images. This involves determining the brightness and saturation of the image, state of shaking or blurring or the like, and so forth, and grading by scores. An example of grading by scores according to the present embodiment will be described. For example, suitability of brightness is set such that the score value is 100 within a predetermined range for average luminance, and the score value drops outside of that predetermined range, as illustrated in FIG. 19B. Also, suitability of saturation is set such that the score value is 100 if the saturation of the overall image is greater than a predetermined saturation value, and the score value gradually drops if smaller than the predetermined value, as illustrated in FIG. 19C.

Figure 20:
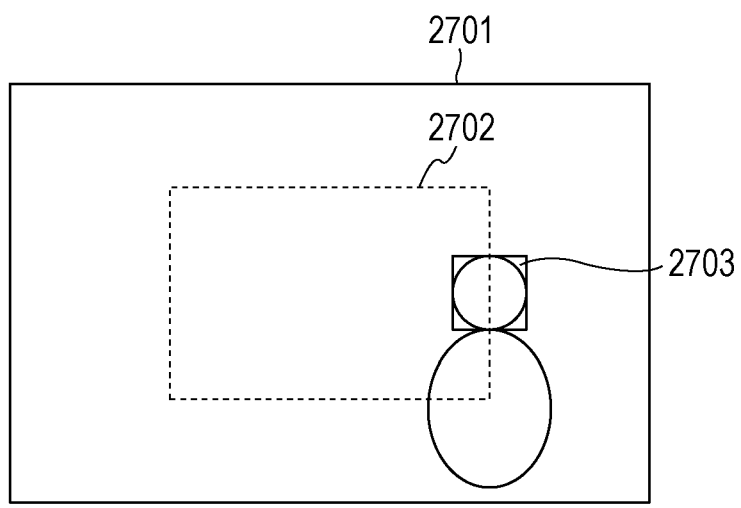
FIG. 20 is an explanatory diagram regarding trimming omission determination processing.

The second is evaluation of suitability between images and slots. Examples of evaluation of suitability between images and slots include person match, and trimming omission determination regarding omission by trimming. The person match represents the ratio of matching between the person specified for a slot and the person in the image actually placed in this slot. For example, if "father" and "son" have been specified in the PersonGroup specified in the XML code for a certain slot, and there are two people in an image assigned to the slot, the person match score is 100 if both of these two persons are in the image. If only one of the two is in the image, the person match score is 50, and the person match score is 0 if neither is in the image. The match for the entire page is obtained by averaging the matches calculated for each slot. Trimming omission of a trimming region 2702 is determined as follows, for example. In a case where a position 2703 of a face in the image has been identified, a trimming omission score value is calculated on a scale of 0 to 100, in accordance with the area of the face which has been omitted by the trimming. If the area omitted by trimming is 0, the score is 100, and conversely if the entire face region is missing, the score is 0, as illustrated in FIG. 20.

The third is evaluation of valance within the layout page. Examples of evaluation values to evaluate balance include similarity of images, variation in pixel value distribution, and variation in objects.

Image similarity will now be described as an evaluation amount for evaluating balance within the layout page. Image similarity is the similarity of images within each layout page, calculated for each of the layout pages of temporary layouts of which a great number is generated. For example, if a layout based on a vacation theme is to be created, and images which are very similar are arrayed in the layout, this may not be a very good layout in some cases. Accordingly, the similarity may be evaluated by date/time of photography. Images with close date/time of photography are likely to have been taken at close locations, while images with more removed date/time of photography are more likely to have been taken for difference scenes. The date/time of photography may be acquired from the image attribute information stored beforehand in the database module 202 for each image, as illustrated in FIG. 9. Similarity is calculated from the date/time of photography as follows. Assumption will be made that a temporary layout, which is currently a temporary layout of interest, has a layout of four images as illustrated in Table 4.

Date/time of photography information is attached to each image identified by image ID. Specifically, the year, month, date, and time (year YYYY, month MM, date DD, hour HH, minute MM, and second SS) is attached as date/time of photography. The amount of time between the two images out of these four images of which the date/time of photography is the closest, i.e., the photography time interval is short, is calculated.

TABLE 4

| Image ID | Date/time of photography (YYYYMMDD:HHMMSS) |
|---|---|
| 25 | 20100101:120000 |
| 86 | 20100101:150000 |
| 102 | 20100101:170000 |
| 108 | 20100101:173000 |

In this case, the 30 minutes between the image IDs 102 and 108 is the shortest interval. This interval is taken as MinInterval, and stored in increments of seconds. That is to say, 30 minutes is 1800 seconds. This MinInterval is calculated for each of the L temporary layouts, and stored in an array stMinInterval [l]. Next, the greatest value MaxMinInterval in the stMinInterval [l] is obtained. Accordingly, a similarity evaluation value Similarity [l] of the 1st temporary layout can be obtained as follows.

Similarity[$l$]=100×stMinInterval[$l$]/MaxMinInterval

As can be seen here, the greater the smallest photography time interval is, the closer Similarity [l] is to 100, and the smaller the photography time interval is the closer Similarity [l] is to 0. Accordingly, this is effective as an image similarity evaluation value.

Description will be made regarding variation in pixel value distribution, as an evaluation amount for evaluating balance within the layout page. Variation in shade of color will be described here as an example of variation in pixel value distribution. For example, if a layout based on a vacation theme is to be created, and images which are very similar in color (e.g., blue sky, green mountains, etc.) are arrayed in the layout, this may not be a very good layout in some cases. Accordingly, in this case, layouts with greater variation in color are evaluated highly. Variance of average hue AveH of the images in the 1st temporary layout, which is currently the temporary layout of interest, is calculated, and stored as color shade variation tmpColorVariance[l]. Next, the greatest value MaxColorVariance in the tmpColorVariance[l] is obtained. Accordingly, a color shade variation evaluation value ColorVariance[l] of the 1st temporary layout can be obtained as follows.

ColorVariance[$l$]=100×tmpColorVariance[$l$]/MaxColorVariance

As can be seen here, the greater the variation in average hue of the images placed in the page is, the closer ColorVariance[l] is to 100, and the smaller the variation in average hue is, the closer ColorVariance[l] is to 0. Accordingly, this is effective as a color shade variation evaluation value. Note however, that variation in pixel value distribution is not restricted to the above-described example.

Description will be made regarding variation in objects, as an evaluation amount for evaluating balance within the layout page. Variation in size of faces will be described here as an example of variation in objects. For example, if a layout based on a vacation theme is to be created, and images with faces which are very similar in size are arrayed in the layout, this may not be a very good layout in some cases. A good layout might be images with large faces and small faces laid out in a well-balanced manner. Accordingly, in this case, layouts with greater variation in face size are evaluated highly. A variance value of face size (distance along diagonal line from upper left to lower right of face) after placement in the 1st temporary layout, which is currently the temporary layout of interest, is calculated, and stored as tmpFaceVariance[l]. Next, the greatest value MaxFaceVariance in the tmpFaceVariance[l] is obtained. Accordingly, a face size variation evaluation value FaceVariance[l] of the 1st temporary layout can be obtained as follows.

FaceVariance[$l$]=100×tmpFaceVariance[$l$]/MaxFaceVariance

As can be seen here, the greater the variation in the size of faces placed in the page is, the closer FaceVariance[l] is to 100, and the smaller the variation in the size of faces is, the closer FaceVariance[l] is to 0. Accordingly, this is effective as a face size variation evaluation value. Note however, that variation in objects is not restricted to the above-described example.

Another category which can be considered here is user preference evaluation. Even if a layout has low evaluation values as determined by the above-described various types of evaluation amounts, a layout which includes photographs which the user personally likes may be a good layout for that user, in some cases. Accordingly, evaluation using evaluation amounts based on user preferences is preferably performed, so as to avoid inhibiting selection of such layouts. The user can set ratings for each of the images beforehand, and accordingly preferences can be evaluated beforehand. Preferences can also be automatically evaluated based on number of times viewed, amount of time viewed, and so forth, for example. Information used for such evaluations can be calculated based on information managed in a FavoriteRate tag, ViewingTimes tag, and PrintingTimes tag.

Average values FavorteRateAve[l], ViewingTimesAve[l], and PrintingTimesAve[l], obtained from each of the values of tag information of all images placed in each slot, are calculated for the 1st temporary layout. Summation thereof enables the user preference evaluation value UserFavor[l] to be obtained as follows.

UserFavor[$l$]=FavorteRateAve[$l$]+ViewingTimesAve[$l$]+PrintingTimesAve[$l$]

The higher the user has rated, the more times viewed, and the more times printed, the images used in the layout, the higher the UserFavor[l] value is. Accordingly, determination can be made in the present embodiment that the higher the UserFavor[l] value is, the closer the layout is to what the user prefers.

Each of the multiple evaluation values calculated for each temporary layout as described above, are integrated as described below, to yield a layout evaluation value for each temporary layout. EvalLayout[l] represents the integrated evaluation value of the 1st temporary layout, and EvalValue [n] represents the value of the N evaluation values calculated above (including each of the evaluation values in Table 3). The integrated evaluation value can be obtained as follows.

$$EvalLayout[l] = \sum_{n=0}^{N} EvalValue[n] \times W[n]$$

In the above expression, W[n] is weighting of each evaluation value of each scene in Table 3. A different weighting is set for each layout theme. For example, comparing the themes growth record "growth" and vacation "travel" in Table 3, it is often preferable for a vacation theme to have as many good-quality photographs from as many difference scenes laid out. Accordingly, the weighting is set with emphasis on individual evaluation values of images, and balance evaluation value within the page. On the other hand, in the case of growth record "growth", it is often preferable for the main character to match each slot, rather than having variation in images, since it is the growth record of this main character that is of interest. Accordingly, the weighting is set with emphasis on evaluation of match between images and slots, rather than balance in the page or individual evaluation values of images. Note that the importance level for each theme has been set as shown in Table 3 in the present embodiment.

The EvalLayout[l] calculated in this way is used in S2109 to generate a layout list LayoutList[k] for layout result display. The method for creating the layout list LayoutList [k] will be described in detail later. This layout list LayoutList[k] is used to correlate a k'th layout order in the rendering display in S605 illustrated in FIG. 6, as to a layout order l regarding which evaluation has ended. The content of the layout list LayoutList[k] is the value of the layout order value l. Display is performed in order from those with a small k in the layout list LayoutList[k].

Figure 21:
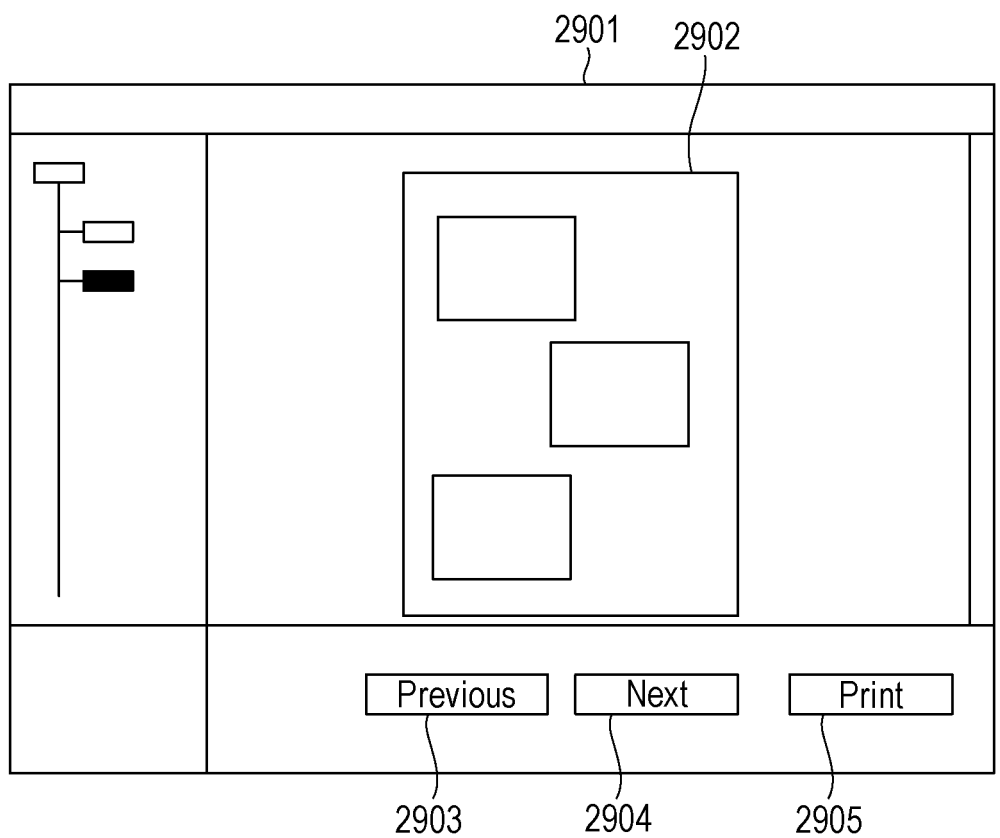
FIG. 21 is a diagram illustrating a display example of automatic layout generating results according to the first embodiment.

Returning to FIG. 6, the layout results obtained by the above-described processing are rendered in S605 in FIG. 6 and are displayed as illustrated in FIG. 21. In S605, a layout identifier stored in LayoutList[0] is first read out, and the temporary layout result corresponding to the identifier is read out from the secondary storage device 103 or RAM 102. Template information, and image names assigned to the slots in the template, are set in the layout result as described above. Accordingly, the layout result is rendered using a drawing function of the operating system (OS) operating on the image processing apparatus 115, based on this information, and displayed as indicated by reference numeral 2902 in FIG. 21.

In FIG. 21, pressing a Next button 2904 causes the layout identifier stored in LayoutList[1], which has the next highest score, to be read out, rendered in the same way as described above, and then displayed. Thus, the user can view proposed layouts of many variations. Pressing a Previous button 2903 displays layouts displayed earlier. Further, if the user likes a displayed layout, the layout result 2902 can be printed from the printer 112 connected to the image processing apparatus 115, by the user pressing a print button 2905.

Figure 25:
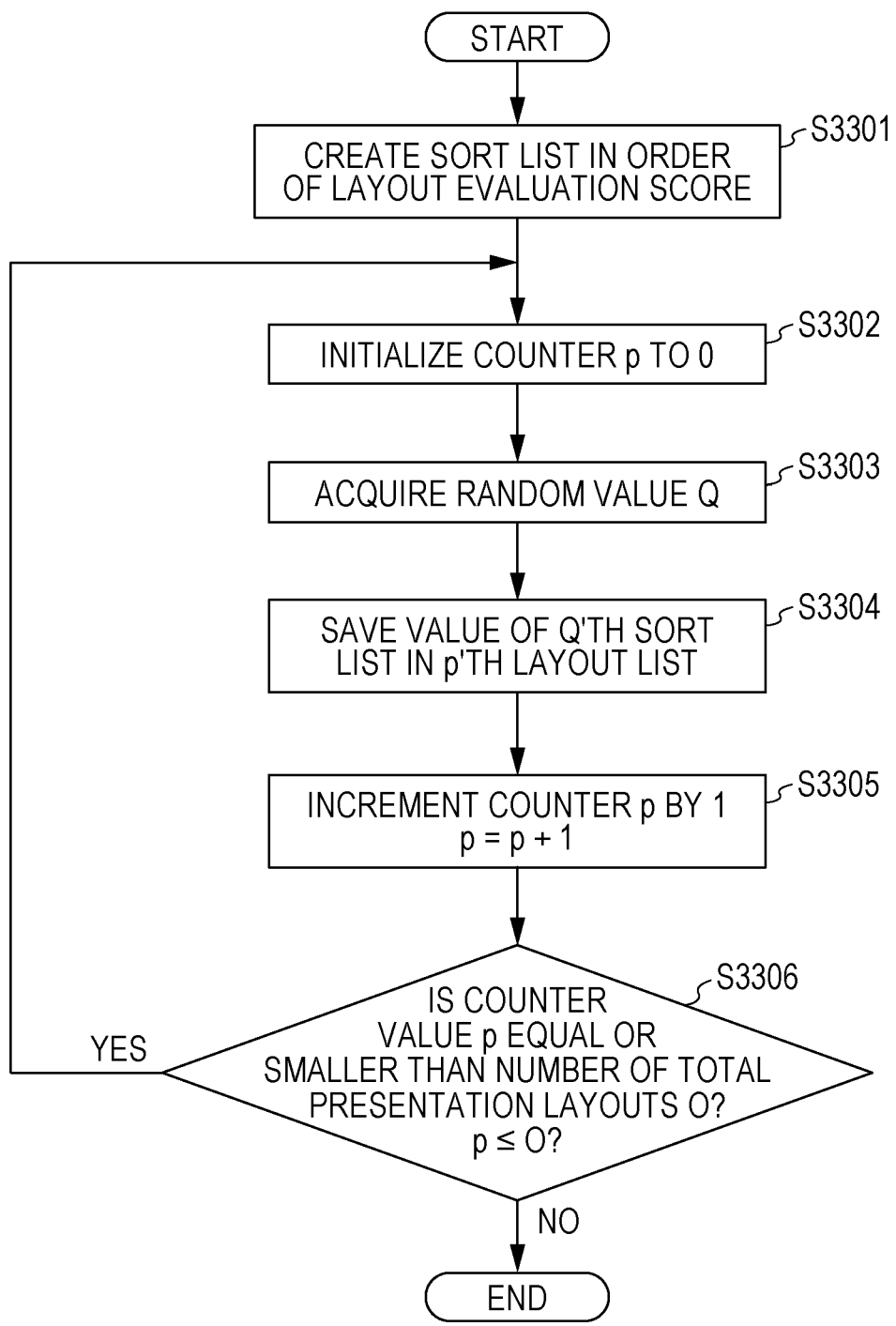
FIG. 25 is a flowchart of list deciding processing for proposed layouts according to the first embodiment.
Figure 26:
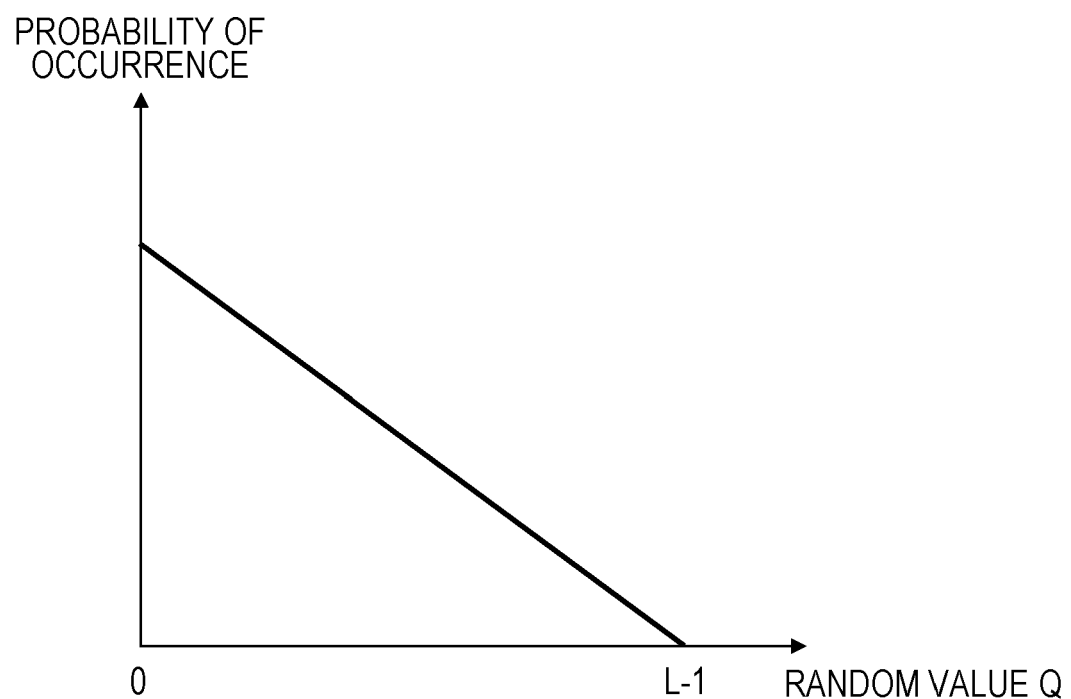
FIG. 26 is a diagram illustrating probability distribution to control correlation of a proposed layout as to an evaluation score, according to the first embodiment.

A method for creating the layout list LayoutList[k] in S2109 in FIG. 17 will be described with reference to FIGS. 25 and 26. FIG. 25 is a flowchart of layout list deciding processing for proposed layouts according to the first embodiment, and FIG. 26 is a diagram illustrating probability distribution to control correlation of a proposed layout as to an evaluation score (evaluation value), according to the first embodiment.

A sort list is created in order of layout evaluation scores in S3301 of FIG. 25. More specifically, a sort list LayoutList [0] is created in which identifiers l from the EvalLayout are listed in descending order of evaluation value. For example, if the temporary layout with the highest score is the l=50'th temporary layout created, then tmpSortLayoutList[0]=50. In the same way, the tmpSortLayoutList[1] stores the identifier l with the second highest score, and so on so that the tmpSortLayoutList[N] stores the identifier l with the N'th highest score.

In S3302, the counter p is initialized to 0.

Next, a random value Q is acquired in S3303. The random value Q is used to select layout candidates, which will be described in detail later. The random value Q is a special random value in which integers in the range of 0 to L−1 (where L is the total number of temporary layouts) are generated at a non-uniform probability. FIG. 26 illustrates the random value Q used in the present embodiment. The horizontal axis represents the generated random value Q, and the vertical axis represents the probability of occurrence of the value on the horizontal axis. FIG. 26 illustrates a function for a straight line where the probability of occurrence of Q=0 is greatest and Q=L−1 is smallest. A different random value Q is generated based on this probability of occurrence in S3303 each time the random value Q is acquired.

In S3304 in FIG. 25, the Q'th value in tmpSortLayoutList [o] is stored in LayoutList[p] based on the acquired random value Q so that LayoutList[p]=tmpSortLayoutList[Q], in which a layout with a score value Q'th from the top is registered in the first (i.e., counter p=0) LayoutList.

In S3305, the counter p is increment by 1, and the flow advances to S3306.

In a case where the counter p is equal to or less than a total number of presentation layouts O in S3306, the flow returns to S3303 and a random value Q is acquired again. This total number of presentation layouts O is the number of layouts prepared beforehand for presentation to the user. An optional value may be set for the total number of presentation layouts O, which may be preset in the ROM 101 or the like, or this may be set by the user. Subsequently, a layout with a Q'th score based on the random number newly acquired in S3303 is registered in the second layout list in S3304. The counter p is increment by 1 in S3305, and comparison is made with the total number of presentation layouts O in S3306 again. Thus, the processing of S3303 through S3305 is repeated until layout lists equivalent to the total number of presentation layouts O have been created. The processing ends when O layout lists have been created.

As described above, layout lists are created using layout evaluation order and random numbers in the present embodiment. These layout lists are created (updated) each time the user activates the application according to the present disclosure. Different layout lists can be created each time by changing the initial value of the random number to be used, using a time stamp from the PC or the like. The layouts are presented to the user based on the results of having created the layout lists.

Now, layouts with similar scores may be similar layout results. For example, if two layout patterns are the same but a part of the images is different, for example, the scores of these two will be similar, as can be understood from the above-described evaluation score calculation method. As for a specific example, if two layouts are made using the layout pattern illustrated in FIG. 15, the same image is laid out at ID=0 at the center, and further all but one of the ID=1 and subsequent images are the same, i.e., only one image is different between the two layouts, the evaluation scores of these two layouts will be similar. Accordingly, if layout lists are created in the order of scores and images presented to the user, the likelihood that similar layouts will be presented to the user, one after another, is high.

On the other hand, certain layout candidates are selected for layout list creation from layout candidates sorted in order of score using random numbers. That is to say, layouts selected using random numbers from the evaluation score order of layout candidates are set in layout lists. Accordingly, the likelihood that consecutive layouts will have similar scores is lower, and accordingly the likelihood that similar layouts will be presented to the user, one after another, can be reduced. That is to say, when presenting layouts to the user one after another, the likelihood that layouts with different evaluation scores, and thus layouts which are not similar, will be presented to the user is higher.

In this way, according to the present embodiment, layout lists are created in order of scores, which are evaluation results, and layout lists to be presented to the user are decided using the score order and random numbers. Thus deciding the presentation order in which presentation is made to the order to be a different order from the order of evaluation values makes it more likely to present non-similar layouts to the user, one after another.

That is to say, according to the present embodiment, each time the application is used, a different variation of layouts can be presented. This enables the user to tirelessly enjoy the same image group being automatically laid out in good layouts.

Also, the random number used for selecting layout candidates in the present embodiment has a probability distribution such as illustrated in FIG. 26, so that layouts with higher scores will be selected with a higher probability. Accordingly, the likelihood that layouts with high evaluation scores will be selected is high, so the user can be automatically presented with high-quality layouts.

In a case of preparing a great number of templates beforehand to handle input of all imaginable image groups, automatically or manually selecting templates in accordance with features of image groups that have been input, and creating layouts accordingly, the resources necessary to hold the great number of templates are considerable. A template suitable for features of image group input has to be selected one way or another. Further, if layout results different from layout results already created are desired, different templates have to be in possession. Conversely, layout lists are created using layout evaluation order and random numbers in the present embodiment, so layouts of different variations can be easily provided, without placing a load on resources.

Also, when increasing the variation in layouts by preparing multiple layout candidates instead of just one layout result, the layouts may be affected by the images if the selected images are the same among the multiple layouts. More specifically, if a selected image itself is undesirable, just changing the display size or position of the image in different layouts will likely result in all layout candidates being undesirable. Conversely, creating layout lists using layout evaluation order and random numbers according to the present embodiment enables layout lists with different images selected to be displayed. Accordingly, the likelihood that better layout results can be obtained is higher.

Second Embodiment

Figure 27A:
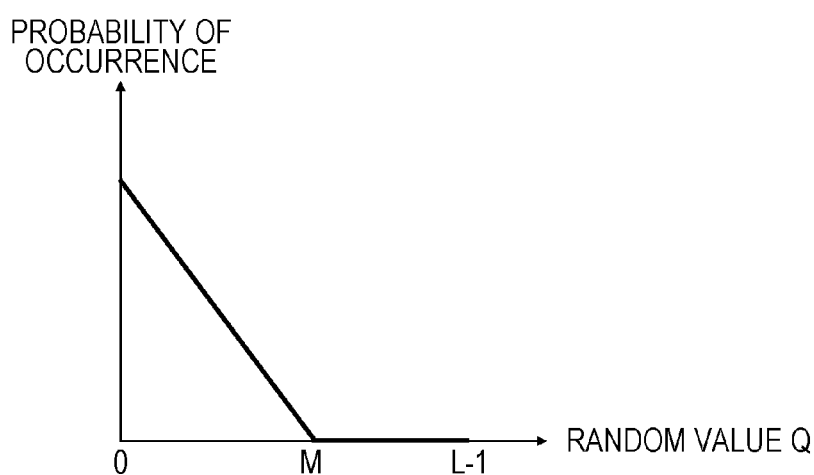
FIGS. 27A through 27C are diagrams illustrating probability distribution to control correlation of a proposed layout as to an evaluation score, according to a second embodiment.
Figure 27B:
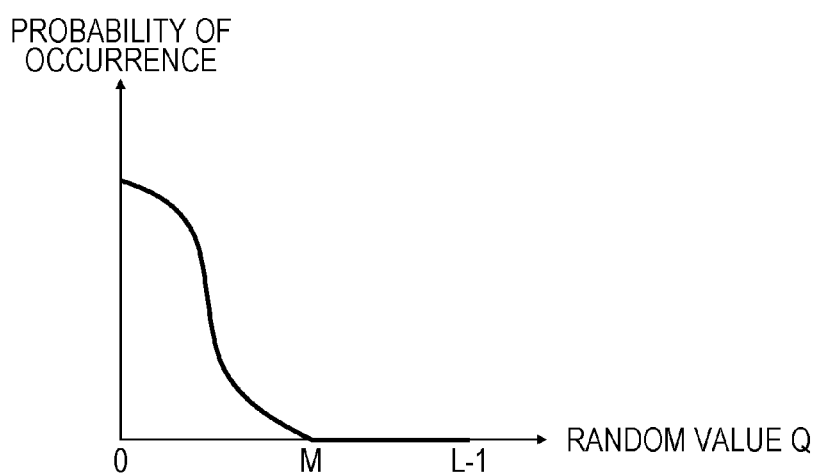
Figure 27C:
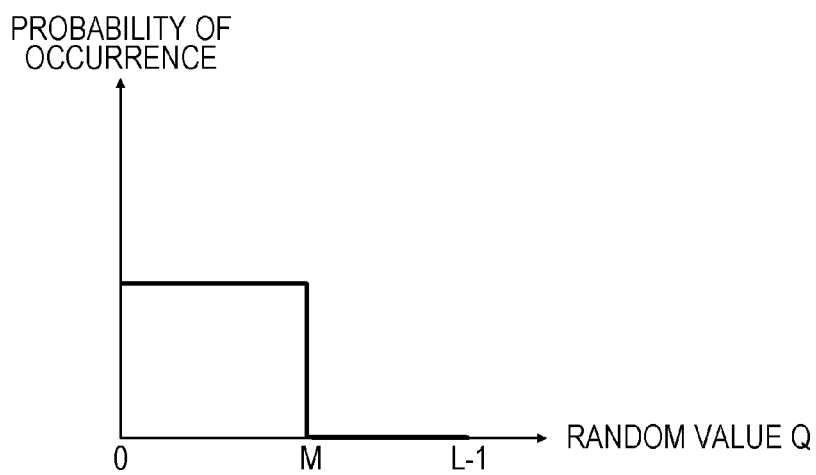

In a second embodiment, random number such as illustrated in FIGS. 27A through 27C are used as the random value Q acquired in S3303 in FIG. 25. Portions which are the same as the first embodiment will be omitted from description. FIGS. 27A through 27C are diagrams illustrating probability distribution used in creating layouts, according to the second embodiment.

The random value Q in FIG. 27A is a special random value in which integers in the range of 0 to L−1 (where L is the total number of temporary layouts) are generated at a non-uniform probability, in the same way as in FIG. 26. The horizontal axis in FIG. 27A represents the generated random value Q, and the vertical axis represents the probability of occurrence of the value on the horizontal axis. FIG. 27A illustrates a function for a straight line where the probability of occurrence of Q=0 is greatest and Q=M (where M<L−1) is smallest, and the probability of occurrence is zero where M<Q (M<L−1). A different random value Q is generated each time the random value Q is acquired based on this probability of occurrence, in the same way as in the first embodiment.

The results of the random value Q are used to add layout candidates, of which the evaluation scores are the Q'th from the top, to the layout list, according to the flowchart in FIG. 25.

Now, the range of evaluation score orders to be selected as candidate layouts can be restricted by the range which the random value Q can assume, since certain candidate layouts are added to the layout list based on the random value Q. In a case of using random numbers with occurrence probability properties such as illustrated in FIG. 27A, only layouts of which the evaluation scores are in the range up to M are registered in the layout list, since the range of random values Q that are generated is restricted to 0 through M.

In the present embodiment, layouts added to the layout list are restricted to layouts of which the evaluation scores are in the range up to M, which prevents layouts with low evaluation orders, i.e., layouts of which the evaluation scores are low, from being registered in the layout list. Accordingly, the user can be presented with only layouts of which evaluation is higher as compared to the first embodiment, while preventing layouts with similar evaluation values from being presented to the user one after another. Consequently, the user can tirelessly enjoy continuous presentation of automatic layout results with high evaluation values.

The random value Q in FIG. 27B is a special random value in which integers in the range of 0 to L−1 (where L is the total number of temporary layouts) are generated at a non-uniform probability, in the same way as in FIG. 26. The horizontal axis in FIG. 27B represents the random value Q, and the vertical axis represents the probability of occurrence of the value on the horizontal axis. The occurrence probability curve illustrated in FIG. 27B is a normal distribution of random numbers, which can be generated from simple random numbers. This normal distribution of random numbers is a random-number-generating algorithm which can assume an occurrence frequency distribution in the form of a normal distribution centered on 0, of which the occurrence range can be adjusted and controlled. The occurrence probability curve illustrated in FIG. 27B generates random numbers of a normal distribution, of which only those in the range of 0 to M are selected, so as to be normalized within the range of selection (the summed frequency of occurrence is 1). In the same way as FIG. 27A, the closer to 0, the higher the probability is, and no values equal to or greater than M occur. The basic advantage of creating layout using the random value Q according to FIG. 27B is the same as using the random value Q according to FIG. 27A, but layouts with higher scores will tend to be selected as compared to using the random value Q according to FIG. 27A.

FIG. 27C is an example where the occurrence probability of numeric values from 0 to M is according to standard random numbers. The higher the score order is the higher the probability is in FIG. 27C, the same as in FIGS. 27A and 27B. Implementation of standard random numbers is easier as compared to other random numbers, so if memory is restricted, the load on memory can be reduced by using the random value Q. Note however, that layouts with low order in evaluation score will appear at the same probability as layouts with higher orders, so M is preferably not a large value. For example, M<(L−1)/2 is preferable. Accordingly, this random value Q enables the user to be presented with layouts of which evaluation is higher, while preventing layouts with similar evaluation values from being presented to the user one after another. Consequently, the user can tirelessly enjoy continuous presentation of automatic layout results with high evaluation values.

As described above, FIGS. 27A through 27C are arranged so that the higher order side in evaluation scores appears with higher probability than the lower order side. Accordingly, this enables the user to be presented only with layouts of which evaluation is high, and consequently, the user can tirelessly enjoy continuous presentation of automatic layout results with high evaluation values.

That is to say, according to the present embodiment, candidate layouts which have higher order evaluation scores can be selected and registered in the layout list, and automatically presented to the user. Accordingly, the user can select from better layouts. Updating the candidate list thereof at predetermined timings allows the user to tirelessly enjoy layouts. Further, the layout list is created is that the order of presentation is different from the order of evaluation scores of the layouts being presented, thus preventing layouts with similar evaluation values from being presented one after another, so the user can tirelessly enjoy layout results.

Third Embodiment

Figure 28:
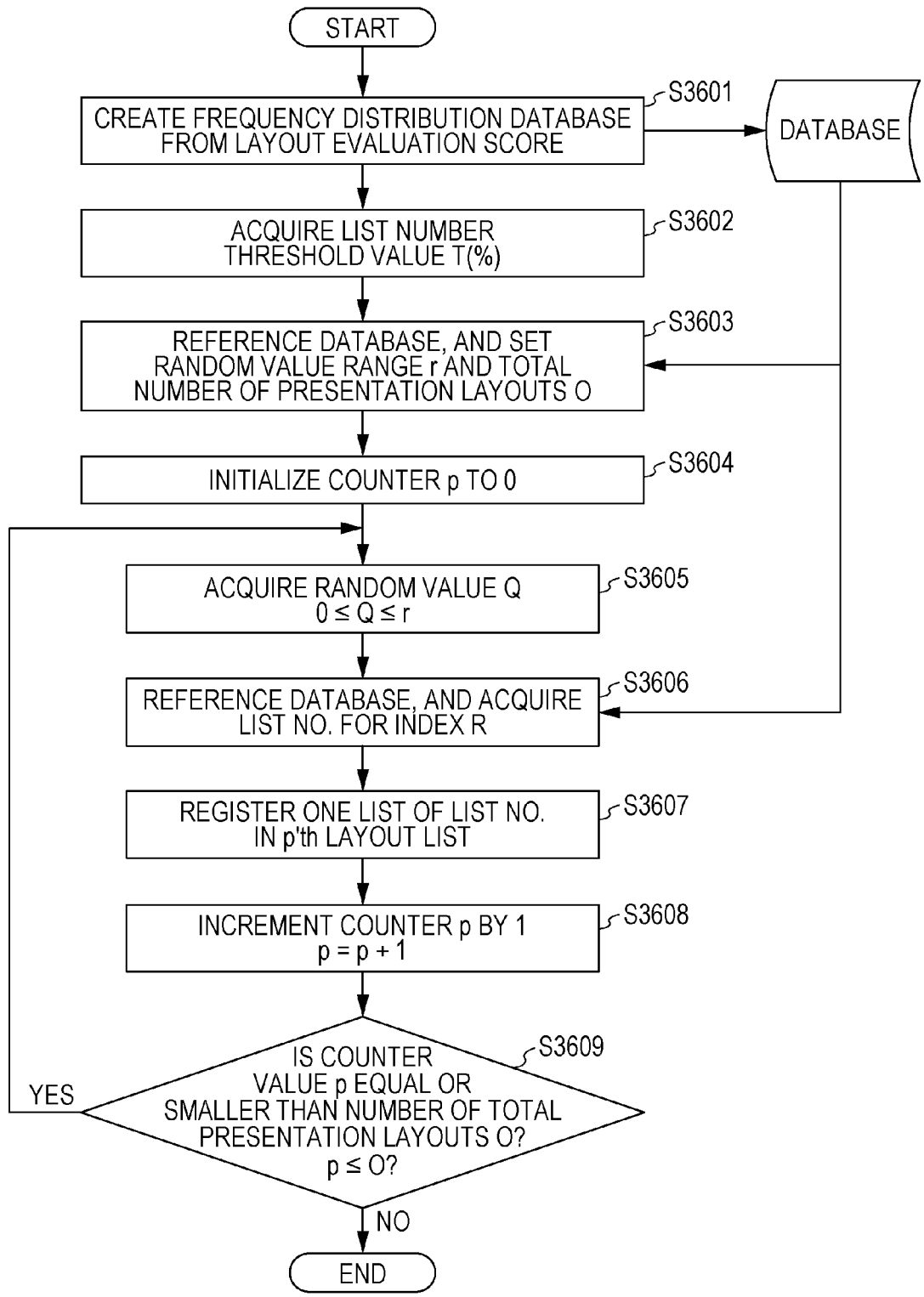
FIG. 28 is a flowchart of list deciding processing for proposed layouts according to a third embodiment.

Creating a layout list according to the present embodiment will be described with reference to FIG. 28. FIG. 28 is a detailed flowchart of creating a layout list in S2109 in FIG. 17. Description which would be redundant with that in the first embodiment will be omitted here.

In S3601, a frequency distribution (histogram) database of layout evaluation scores (EvalLayout values) is created. Table 5 illustrates an example of a frequency distribution database that is created. Included in the database are, in correlation to an index number R (column 1) are a score range of a corresponding frequency distribution (column 2), the number of lists of layout candidates in this score range (column 3), the accumulated frequency (%) to this score range, and layout list Nos. 1 in this score range (column 5).

TABLE 5

Evaluation Score Degree Distribution Table of Layout Candidate Images

| Column 1 Index R | Column 2 Score Range | Column 3 Number of Lists S | Column 4 Accumulated frequency (%) | Column 5 List No. |
|---|---|---|---|---|
| 0 | to 100 | 3 | 2 | 4, 60, 134, ... |
| 1 | to 95 | 8 | 6 | 15, 45, ... |
| 2 | to 90 | 6 | 9 | ... |
| 3 | to 85 | 10 | 14 | ... |
| 4 | to 80 | 18 | 23 | ... |
| 5 | to 75 | 15 | 30 | ... |
| . | . | . | . | . |
| . | . | . | . | . |
| . | . | . | . | . |
| 18 | to 10 | 5 | 100 | ... |
| 19 | to 5 | 0 | 100 | ... |

In S3602, a list number threshold value (%) is acquired, which specifies how many percent from the top of evaluation values are to be included as layouts to be added to the layout list, out of the total number of temporary layouts created for evaluation. T=30% in the present embodiment, for example.

In S3603, the database created in S3610 is referenced, and the random value range r and total number of presentation layouts O are set. In the present embodiment, the index value R satisfying T (i.e., 30)% out of the accumulated frequencies in column 4 in the database, set in S3602 (i.e., 5), is set as the random value range r (i.e., 5).

Next in S3604, the counter p is initialized to 0.

In S3605, a random value Q is acquired. At this time, the random value Q is 0 or greater but the random value range r or lower. Random number generation is performed from 0 to 5, based on the random number range r set in S3603 (i.e., 5). The random numbers used here are of a probability distribution such as illustrated in FIGS. 26 through 27C, where the range of the random value Q is 0 through r (5 in this case), and the smaller the value of the random value Q is, the higher the probability of occurrence of the random number used is.

In S3606, the database is referenced, and the list No. corresponding to the index R is acquired. Here, the database is referenced again based on the random value Q generated in S3605 (2 in this case), and the list No. value of the row of the index R corresponding to the random value Q is acquired.

In S3607, one of the list Nos. acquired in S3606 is stored in the LayoutList[p].

In S3608, the counter p is incremented by 1, and if the counter p is equal to or less than the total number of presentation layouts O in S3609, the flow returns to S3605, and acquires a random value Q again. Note that the total number of presentation layouts O here is an optionally set value, indicating the number of layouts to be prepared beforehand for user presentation. S3303 through S3305 are repeated until layout lists of a number equivalent to the total number of presentation layouts O are created. Once O layout lists are prepared, the flow ends. In the present embodiment, layout lists are created by selecting evaluation score orders of layout candidates using random numbers within a predetermined range. As described above, if two layouts are made using the same and only part of the images are different, the evaluation scores of these two layouts will be similar. Accordingly, if layout lists are created with similar evaluation scores and images presented to the user, the likelihood that similar layouts will be presented to the user, one after another, is high. Accordingly, the likelihood that consecutive layouts will have similar scores is lower, and the likelihood that similar layouts will be presented to the user, one after another, can be reduced.

Also, random numbers to select the evaluation score order have an occurrence probability distribution such as illustrated in FIGS. 26 through 27C, so layouts with higher score are selected with higher probability for the layout list. Accordingly, the user can be automatically presented with high-quality layouts.

Other Embodiments

The above-described embodiments are examples to realize the advantages of the present disclosure, and if using similar but different techniques or different parameters obtains advantages equivalent to those of the present disclosure, these are also included in the scope of the present disclosure.

The above embodiments have been described with regard to cases where layout lists are created using random numbers with occurrence probability distribution such as illustrated in FIGS. 26 through 27C, so as to select more layout candidate images with high scores, but the embodiments are not restricted thusly. For example, a look-up table prepared beforehand may be used in S3303 in FIG. 25 instead of the random value Q. In this case, the look-up table has as many correlated sets of counter value p and identifier l as the total number of presentation layouts O. By making the frequency of occurrence of the identifiers l to be such as that illustrated in FIG. 26, advantages the same as the first embodiment can be obtained.

It is sufficient for the order of presentation of layout candidates to the user to be different from the order of evaluation values. The concept of "different order" holds as long as the order of presentation of layout candidates and the order of evaluation values is not completely the same, so an arrangement where the order is partially different is included. For example, the presentation order may be layout candidates of which the score orders are first, second, third, sixth, eight, and so on, i.e., partially the same as evaluation value order.

Description has been made in the embodiments above that the layout list is updated each time the application is activated, but the updating timing is not restricted to this. For example, an arrangement may be made where the layout list is automatically updated when a predetermined time period elapses, such as so many hours or so many days, and the initial value of the random number is changed at that timing. This arrangement where a predetermined timing is awaited to update the layout list is preferable in cases where it is advantageous to the user for the state of the layout list to be the same for a predetermined time period. For example, in a case where the user selects and prints a certain layout, and then will print this layout again, it is better if the layout list remains the same until printed out again. As time passes, the need to output the same layout again can be considered to lessen, so the layout list is updated after a predetermined time period. This enables different variations of layouts to be presented, so the user can tirelessly enjoy the same image group being automatically laid out.

Another example is to provide some sort of an instruction arrangement in the application, so as to accept user input. The layout list may be updated at a timing instructed by the user, and the initial value of the random numbers may be changed at this timing. In this case, whether the user has tired of the previous layouts may be reflected more clearly. Yet another example is to automatically update the layout list and initialize the random numbers after the user has printed one of the presented layout candidates. In this case, the user can be presented with new presentation orders each time printing operations are performed. A further example is to update the layout list each time the PC is activated. This can be performed in the background in cases where layouts are to be created before activating the application. Accordingly, the user can immediately see new layouts when activating the application.

Also, while description has been made regarding the above embodiments assuming that there is a sufficient number of images which can be selected as to the number of regions in a template where images are to be placed (e.g., there is a sufficient number of images input). However, if the number of images is not sufficiently greater than the number of regions to place images, the same sort of image selection will be performed however many layouts are created. For example, if the number of regions to place images is three, and there are only four images to select from, two images will always be the same regardless of how many layouts are created. Thus, there are cases where restricting the ratio of inclusion of same images in one layout and the next layout will prevent displaying multiple layouts. Hereinafter, the ratio of redundant images tolerated in one layout and the next layout will also be referred to as "tolerance ratio".

Accordingly, in order to display multiple layouts without fail, the tolerance ratio is preferably arranged to be dynamically changed based on the number of images which can be selected and the number of regions where the images are to be placed in the template. Specifically, the closer the number of input images is to the number of images to be placed, the lower the judgment standard for layout similarity evaluation value may be set, so that the threshold value allows for similar layouts. On the other hand, the farther the number of input images is from the number of images to be laid out, the higher the judgment standard for layout similarity evaluation value may be set, so that the threshold value does not allow for very similar layouts. Alternatively, the tolerance ratio may be automatically calculated based on the number of images which can be selected and the number of images to be laid out (e.g., the number of regions in the template where images are to be placed), for example. As one example, a value obtained by multiplying the number of necessary layouts by the number of regions in the template where images are to be placed, and then dividing this value by the number of images which can be selected, may be used as the tolerance ratio. In this case, the tolerance ratio is obtained by the following expression.

$$\text{Tolerance ratio} = \text{necessary number of layouts} \times (\text{number of regions in template to place images} / \text{number of images which can be selected}) \times 100\%$$

For example, if the necessary number of layouts is 10, the number of regions in the template to place images is 3, and the number of images which can be selected is 100, then Tolerance ratio=$10 \times (3/100) \times 100 = 30$ so the tolerance ratio is 30. It is sufficient that the tolerance ratio can be calculated in accordance with the number of images which can be selected in this way, and any calculation method may be used. Thus changing the tolerance ratio depending on the number of images which can be selected enables varied layouts to be presented, where similar layouts are not readily consecutively presented, while taking into consideration availability of layouts which can be generated.

While description has been made regarding a case of presetting or automatically setting the tolerance ratio, the tolerance ratio is not restricted to the above, and may be set by the user, for example. In this case, user demands, such as not wanting similar images to be placed at all, can be reflected in the settings.

While an arrangement has been described in the above embodiments where a layout list is created in which candidate layouts are arranged in an order different from the evaluation score order of the candidate layouts, such a layout list and a layout list in the same order as the evaluation score order of the candidate layouts may both be held in the same program. These layout lists may then be switched between, under some sort of instructions such as user instructions or the like. In this case, the layout evaluation values can be held in common, so the processing load can be reduced. Accordingly, the user can select a form which he/she prefers, by having different layout lists held therein. Further, a configuration may be made where user tendencies are learned at the time of calculating evaluation scores, so as to reflect user intent in the layout lists more clearly. Holding different layout lists is particularly effective in a case of having such a configuration.

Also, while persons have been exemplified as objects in the above-described embodiments, objects are not restricted to persons. For example, recognition processing may be performed on pets such as dogs or cats to recognize these, and accordingly pets may be set as objects. Also, buildings, small items, and so forth can be recognized by shape recognition processing through edge detection and so forth, so buildings, small items, and so forth can be set as objects.

While the above embodiments have been described by way of examples of generating layout output products in which multiple images are placed on one page, the present disclosure can also be applied to output of albums having multiple pages.

The present disclosure maybe applied to a system configured including multiple apparatuses (e.g., a host computer, interface equipment, reader, printer, etc.), or may be applied to a standalone apparatus (e.g., printer, copying machine, facsimile apparatus, etc.).

The above-described embodiments may also be realized by executing the following processing. That is to say, software (program) realizing the functions of the above-described embodiments are supplied to a system or apparatus via a network or various types of storage mediums, and a computer (CPU or microprocessor unit (MPU)) of the system or apparatus reads out and executes the program. The program may be executed on a single computer, or multiple computers may be operated collaboratively to execute the program. There is no need to realize all of the above-described processing by software, and part or all of the processing may be realized by hardware.

According to the above-described embodiments, multiple layout candidates are created, evaluated, and a layout list thereof is created, so the likelihood of obtaining desirable layout results improves. Accordingly, a variety of good layouts with overall consistency can be obtained in accordance with the image group.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-184047, filed Sep. 5, 2013, which is hereby incorporated by reference herein in its entirety.

What is claimed is:

1. An apparatus having one or more processors executing instructions in one or more memories, wherein the instructions causing the one or more processors to function comprise:

an acquisition unit configured to acquire at least one image group including at least one image;

a creating unit configured to create a plurality of layout candidates, by selecting at least one image from an image group acquired by the acquisition unit, and arranging the at least one selected image;

an evaluation unit configured to evaluate the layout candidates created by the creating unit;

a deciding unit configured to decide a presentation order of layout candidates by selecting the layout candidates from the plurality of layout candidates, based on evaluation results from the evaluation unit and a predetermined rule different from evaluation, the predetermined rule being a rule for selecting a layout candidate based on evaluation results from the evaluation unit; and a presenting unit configured to present the selected layout candidates in the presentation order decided by the deciding unit;

wherein the deciding unit decides the presentation order so that the presentation order is different from an evaluation order based on evaluation results from the evaluation unit, based on evaluation results of the evaluation unit.

2. The apparatus according to claim 1, wherein, in a case of presenting a predetermined number of layout candidates, the deciding unit decides the presentation order such that, in the predetermined number of layout candidates, a number of layout candidates with high evaluation values is larger than a number of layout candidates with low evaluation values.

3. The apparatus according to claim 1,
wherein the creating unit creates multiple layout candidates by changing at least selection of images to be arranged in a layout.

4. The apparatus according to claim 1,
wherein the deciding unit decides the presentation order based on the evaluation order based on evaluation results from the evaluation unit and a random number as the predetermined rule.

5. The apparatus according to claim 4, wherein an initial value of the random number is changed at a timing of updating the presentation order.

6. The apparatus according to claim 4, wherein a different random value is used each time the random number is used.

7. The apparatus according to claim 4, wherein the random number has a probability distribution such that a layout candidate with a high evaluation value is selected with a high probability.

8. The apparatus according to claim 1,
wherein the deciding unit decides the presentation order based on a frequency distribution of the evaluation order based on evaluation results from the evaluation unit as the predetermined rule.

9. The apparatus according to claim 1,
wherein the presenting unit performs presentation at one or more timings of, when an application is activated, after a predetermined amount of time has elapsed, after a layout decided by the deciding unit has printed, and when a personal computer is activated.

10. The apparatus according to claim 1, wherein the presentation order is updated at predetermined timings.

11. The apparatus according to claim 1, wherein the presentation order is updated at one or more timings of, when an application is activated, after a predetermined amount of time has elapsed, after a layout decided by the deciding unit has printed, and when a personal computer is activated.

12. The apparatus according to claim 1, wherein the predetermined rule is a rule for deciding the presentation order so as to be different from the evaluation order based on evaluation results from the evaluation unit.

13. A method performed by an apparatus having one or more processors executing instructions in one or more memories, the method comprising:
acquiring at least one image group including at least one image;
creating a plurality of layout candidates, by selecting at least one image from an image group acquired in the acquiring, and arranging the at least one selected image;
evaluating the layout candidates created in the creating;
deciding a presentation order of layout candidates by selecting the layout candidates from a plurality of layout candidates, based on evaluation results in the evaluating and a predetermined rule different from evaluation, the predetermined rule being a rule for selecting a layout candidate based on evaluation results in the evaluating; and
presenting the selected layout candidates in the presentation order decided in the deciding;
wherein the presentation order is decided in the deciding so that the presentation order is different from an evaluation order based on evaluation results in the evaluating, based on evaluation results in the evaluating.

14. The method according to claim 13,
wherein, in a case of presenting a predetermined number of layout candidates, the presentation order is decided in the deciding such that, in the predetermined number of layout candidates, a number of layout candidates with high evaluation values is larger than a number of layout candidates with low evaluation values.

15. The method according to claim 13,
wherein multiple layout candidates are created in the creating by changing at least selection of images to be arranged in a layout.

16. The method according to claim 13,
wherein the presentation order is decided in the deciding based on an evaluation order in evaluation results from the evaluating, and a random number.

17. The method according to claim 13,
wherein the presentation order is decided in the deciding based on a frequency distribution of an evaluation order in evaluation results from the evaluating.

18. The method according to claim 13,
wherein the presentation is performed in the presenting at one or more timings of, when an application is activated, after a predetermined amount of time has elapsed, after a layout decided by the deciding has printed, and when a personal computer is activated.

19. A non-transitory storage medium storing a program causing a computer to execute a method comprising:
acquiring at least one image group including at least one image;
creating a plurality of layout candidates, by selecting at least one image from an image group acquired in the acquiring, and arranging the at least one selected image;
evaluating the layout candidates created in the creating;
deciding a presentation order of layout candidates by selecting the layout candidates from the plurality of layout candidates, based on evaluation results in the evaluating and a predetermined rule different from evaluation, the predetermined rule being a rule for selecting a layout candidate based on evaluation results in the evaluating; and
presenting the selected layout candidates in the presentation order decided in the deciding;
wherein the presentation order is decided in the deciding so that the presentation order is different from an evaluation order based on evaluation results in the evaluating, based on evaluation results in the evaluating.

* * * * *